(12) United States Patent
Ahn et al.

(10) Patent No.: US 8,448,071 B2
(45) Date of Patent: May 21, 2013

(54) MOBILE TERMINAL AND METHOD FOR DISPLAYING INFORMATION

(75) Inventors: Hye-Sang Ahn, Seoul (KR); Kwon Han Bae, Seoul (KR); Jungwoo Kim, Seoul (KR); Yong Deok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 930 days.

(21) Appl. No.: 12/547,061

(22) Filed: Aug. 25, 2009

(65) Prior Publication Data

US 2010/0302179 A1    Dec. 2, 2010

(30) Foreign Application Priority Data

May 29, 2009  (KR) .................. 10-2009-0047385

(51) Int. Cl.
  *G06F 3/041*   (2006.01)
(52) U.S. Cl.
  USPC ........................ 715/746; 455/557; 707/3
(58) Field of Classification Search
  USPC ..................................................... 715/746
  See application file for complete search history.

(56) References Cited

U.S. PATENT DOCUMENTS

| | | | |
|---|---|---|---|
| 4,679,137 A * | 7/1987 | Lane et al. .................. 700/83 |
| 2004/0067770 A1* | 4/2004 | King et al. .................. 455/557 |
| 2005/0246647 A1* | 11/2005 | Beam et al. ................. 715/747 |
| 2006/0095840 A1* | 5/2006 | Weng .......................... 715/530 |
| 2006/0277167 A1* | 12/2006 | Gross et al. ..................... 707/3 |
| 2007/0035764 A1* | 2/2007 | Aldrich et al. .............. 358/1.15 |
| 2009/0201266 A1* | 8/2009 | Hashimoto et al. .......... 345/173 |
| 2009/0251566 A1* | 10/2009 | Uemura .................. 348/231.99 |

\* cited by examiner

*Primary Examiner* — Matt Kim
*Assistant Examiner* — Tuan S Nguyen
(74) *Attorney, Agent, or Firm* — KED & Associates, LLP

(57) ABSTRACT

A mobile terminal and method for displaying information in the mobile terminal may be provided that includes first and second touch screens, and a controller to display both an item list including a plurality of information items and first information related to a first information item selected from the item list on the first touch screen. The controller may display one of the item list and the first information on the second touch screen when the second touch screen is activated based on manipulation of the mobile terminal. The controller may display second information associated with a second information item on the touch screen on which the first information is already displayed as the second information item is selected from the item list in a state that the first information item is selected.

20 Claims, 20 Drawing Sheets

MOBILE TERMINAL AND METHOD FOR DISPLAYING INFORMATION

This application claims priority from Korean Patent Application No. 10-2009-0047385, filed May 29, 2009, the subject matter of which is incorporated herein by reference.

BACKGROUND

1. Field

Embodiments of the present invention may relate to a mobile terminal and to a method for displaying a plurality of information items included in an item list.

2. Background

As functions of mobile terminals (such as personal computers, notebook computers, mobile phones, and the like) are diversified, mobile terminals may be implemented as multimedia players having composite functions such as capturing images and video via a camera, playing music or video files, playing games, receiving broadcast, and the like.

Mobile terminals may be classified as mobile terminals and stationary terminals based on whether or not the terminals are movable. Mobile terminals may be classified as a handheld terminal and a vehicle mount terminal based on whether or not users can directly carry the terminal.

Efforts are ongoing to support and increase functionality of mobile terminals. The efforts include software and hardware improvements as well as changes and improvements in structural components that form the mobile terminal.

Mobile terminals that include a touch screen may have popularity because they fit a users' preference for a large screen, accomplish users' convenience for input manipulation, have a good design, and/or etc.

BRIEF DESCRIPTION OF THE DRAWINGS

Arrangements and embodiments may be described in detail with reference to the following drawings in which like reference numerals refer to like elements and wherein.

DETAILED DESCRIPTION

A mobile terminal according to example embodiments and/or arrangements may now be described in detail with reference to the accompanying drawings. In the following description, usage of suffixes such as 'module', 'part' or 'unit' used for referring to elements may be provided merely to ease explanation without having any significant meaning by itself.

Mobile terminals may include mobile phones, smart phones, notebook computers, digital broadcast receivers, Personal Digital Assistants (PDAs), Portable Multimedia Player (PMPs), navigation devices, and/or the like.

Figure 1:
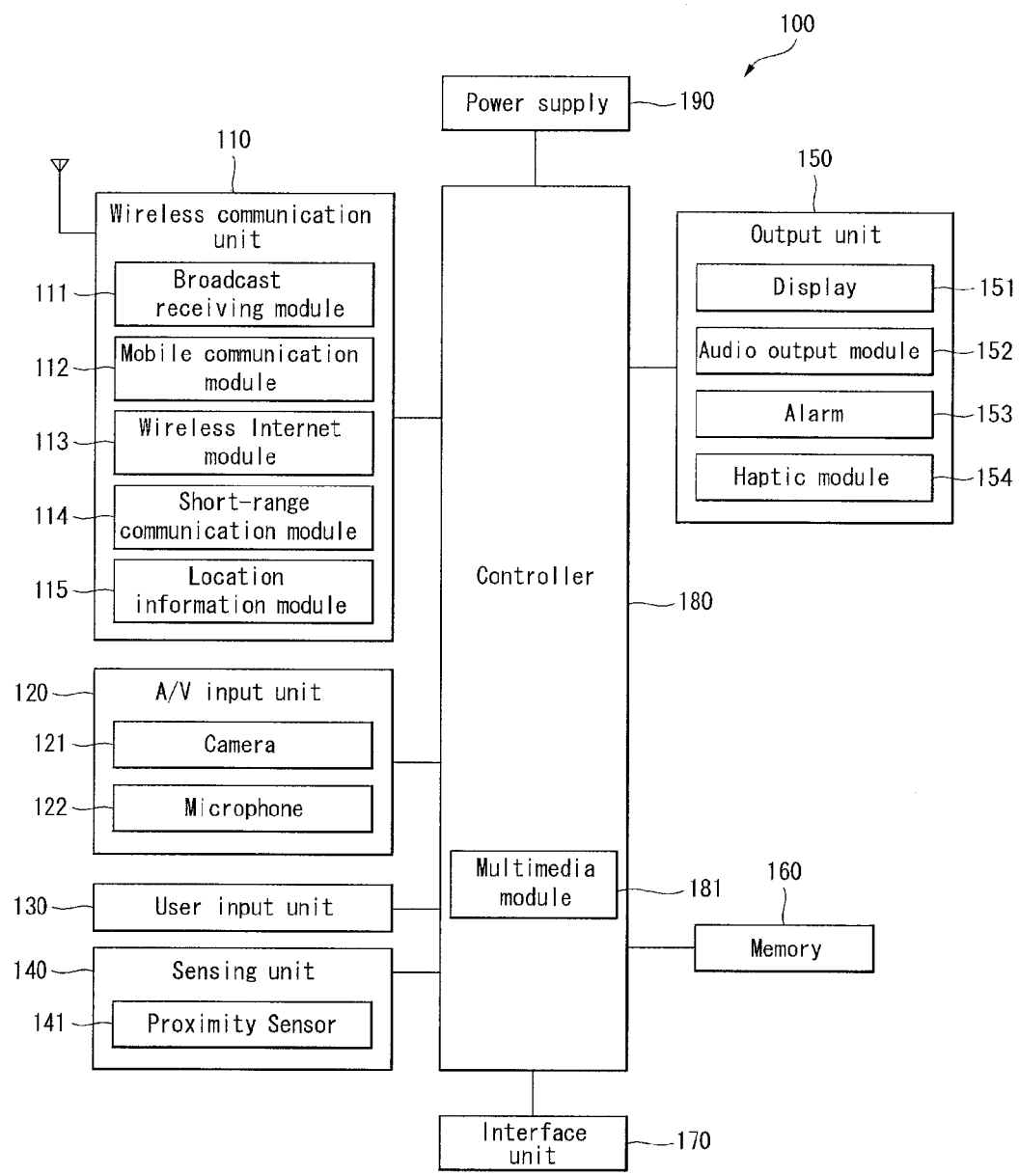
FIG. 1 is a schematic block diagram of a mobile terminal according to an example embodiment.

FIG. 1 is a block diagram of a mobile terminal according to an example embodiment. Other embodiments and arrangements may also be provided.

FIG. 1 shows that a mobile terminal 100 may include a wireless communication unit 110, an Audio/Video (A/V) input unit 120, a user input unit 130, a sensing unit 140, an output unit 150, a memory 160, an interface unit 170, a controller 180, and a power supply 190, etc. FIG. 1 shows the mobile terminal 100 as having various components, although other components may also be used. More or less components may alternatively be implemented.

The wireless communication unit 110 may include one or more modules that permit radio communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115 (or a position-location module).

The broadcast receiving module 111 may receive broadcast signals and/or broadcast associated information from an external broadcast management server (or entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may be a TV broadcast signal, a radio broadcast signal, a data broadcast signal, and/or the like. The broadcast signal may further include a broadcast signal combined with a TV signal or a radio broadcast signal.

The broadcast associated information may refer to information associated with a broadcast channel, a broadcast program and/or a broadcast service provider. The broadcast associated information may also be provided via a mobile communication network. The broadcast associated information may be received by the mobile communication module 112.

The broadcast signal may be implemented in various forms. For example, the broadcast signal may exist in the form of an electronic program guide (EPG) of digital multimedia broadcasting (DMB), an electronic service guide (ESG) of digital video broadcast-handheld (DVB-H), and/or the like.

The broadcast receiving module 111 may receive broadcast signals by using various types of broadcast systems. For example, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be suitable for other broadcast systems that provide a broadcast signal as well as the above-described digital broadcast systems.

The broadcast signals and/or the broadcast-associated information received via the broadcast receiving module 111 may be stored in the memory 160.

The mobile communication module 112 may transmit and/or receive radio signals to and/or from at least one of a base station, an external terminal, and/or a server. The radio signals may include a voice call signal, a video call signal and/or various types of data according to text and/or multimedia message transmission and/or reception.

The wireless Internet module 113 may support wireless Internet access for the mobile terminal 100. The wireless Internet module 113 may be internally or externally coupled to the terminal 100. The wireless Internet access technique may include a WLAN (Wireless LAN) (Wi-Fi), WiBro (Wireless broadband), WiMAX (World Interoperability for Microwave Access), HSDPA (High Speed Downlink Packet Access), and/or the like.

The short-range communication module 114 may support short range communications. Examples of short-range communication technology may include Bluetooth™, Radio Frequency IDentification (RFID), Infrared Data Association (IrDA), Ultra-WideBand (UWB), ZigBee™, and/or the like.

The location information module 115 may check or acquire a location (or position) of the mobile terminal 100. For example, the location information module 115 may be embodied using a Global Positioning System (GPS) module. The GPS module may calculate information about distance from three or more satellites to one point (entity) and information about time at which the distance information was measured, and apply trigonometry to the calculated distance information to obtain three-dimensional location information according to latitude, longitude/or and altitude with respect to one point at a particular time. A method of calculating location and time information by using three satellites and correcting an error of the calculated location and time information by using another one satellite may also be employed. The GPS module may continuously calculate a current location in real time, and also calculate speed information by using the same.

The A/V input unit 120 may receive an audio or video signal. The A/V input unit 120 may include a camera 121 and a microphone 122. The camera 121 may process image frames of still pictures or video obtained by an image sensor in a video capturing mode or an image capturing mode. The processed image frames may be displayed on a display 151.

The image frames processed by the camera 121 may be stored in the memory 160 or transmitted to the exterior via the wireless communication unit 110. Two or more cameras 121 may be provided based on the configuration of the mobile terminal 100.

The microphone 122 may receive sounds (audible data) in a phone call mode, a recording mode, a voice recognition mode, and/or the like, and process the sounds into electrical audio data. The processed audio (voice) data may be converted for output into a format transmittable to a mobile communication base station via the mobile communication module 112 in case of a phone call mode. The microphone 122 may utilize noise canceling (or suppression) algorithms to cancel, remove or reduce noise and/or interference generated in the course of receiving and transmitting audio signals.

The user input unit 130 may generate input data from commands entered by a user to control various operations of the mobile terminal 100. The user input unit 130 may include a keypad, a dome switch, a touch pad (e.g., a touch sensitive member that detects changes in resistance, pressure, capacitance, etc. due to being contacted), a jog wheel, a jog switch, and/or the like.

The sensing unit 140 may detect a current status (or state) of the mobile terminal 100 such as an opened state (or open configuration) or closed state (or closed configuration) of the mobile terminal 100, a location of the mobile terminal 100, a presence or absence of user contact with the mobile terminal 100 (i.e., touch inputs), an orientation of the mobile terminal 100, an acceleration or deceleration movement of the mobile terminal 100, etc., and may generate commands or signals for controlling operation of the mobile terminal 100. For example, when the mobile terminal 100 is a slide type mobile phone, the sensing unit 140 may sense whether the slide phone is opened (or in an opened configuration) or is closed (or in a closed configuration). The sensing unit 140 may also detect whether or not the power supply 190 supplies power and/or whether or not the interface unit 170 is coupled with an external device. The sensing unit 140 may also include a proximity sensor 141.

The output unit 150 may provide outputs in a visual, audible, and/or tactile manner. The output unit 150 may include the display 151, an audio output module 152, an alarm 153, a haptic module 154, and/or the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or an image capturing mode, the display 151 may display a captured image and/or a received image, a UI and/or a GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and/or the like.

The display 151 may be configured to be transparent and/or light-transmissive to allow viewing of the exterior, and may be called a transparent display. A typical transparent display may be, for example, a Transparent Organic Light Emitting Diode (TOLED) display, and/or the like. A rear structure of the display 151 may be light-transmissive. In such a configuration, a user may view an object located at a rear of the terminal body via a region taken by the display 151 of the terminal body.

The mobile terminal 100 may include two or more display units. For example, the mobile terminal 100 may include a plurality of displays that are separately or integrally provided on one surface and/or separately provided on different surfaces of the mobile terminal 100.

When the display 151 and a sensor (hereafter called a touch sensor) for detecting a touch operation are overlaid in a layered manner (hereafter called a touch screen), the display 151 may be used as both an input device and an output device. The touch sensor may have the form of a touch film, a touch sheet, a touch pad, etc, for example.

The touch sensor may convert a pressure applied to a particular portion of the display 151 or a change in capacitance generated at a particular portion of the display 151 into an electrical input signal. The touch sensor may detect the pressure when a touch is applied and a direction as well as a touched position and/or area.

When a touch with respect to the touch sensor is inputted, a corresponding signal (or signals) may be transmitted to a touch controller. The touch controller may process the signal (or signals) and transmit corresponding data to the controller 180. The controller 180 may recognize which portion of the display 151 has been touched.

The proximity sensor 141 may be provided within the mobile terminal 100 covered by the touch screen and/or near the touch screen. The proximity sensor 141 may be a sensor for detecting presence or absence of an object that accesses a certain surface or an object that exists nearby by using a force of electromagnetism or infrared rays without a mechanical contact. The proximity sensor 141 may have a longer life span as compared with a contact type sensor, and the proximity sensor 141 may be utilized for various purposes.

Examples of the proximity sensor 141 may be a transmission type photoelectric sensor, a direct reflection type photoelectric sensor, a mirror-reflection type photoelectric sensor, an RF oscillation type proximity sensor, a capacitance type proximity sensor, a magnetic proximity sensor, and/or the like.

When the touch screen is an electrostatic type touch screen, an approach of a pointer may be detected based on a change in an electric field according to the approach of the pointer. In this case, the touch screen (touch sensor) may be classified as a proximity sensor.

In the following and for ease of description, recognition of a pointer positioned close to the touch screen without contacting the touch screen may be called a proximity touch whereas actual contacting of the pointer on the touch screen may be called a contact touch. When the pointer is in a state of the proximity touch, the pointer may be positioned to correspond vertically to the touch screen.

The proximity sensor 141 may detect a proximity touch and a proximity touch pattern (e.g., a proximity touch distance, a proximity touch direction, a proximity touch speed, a proximity touch time, a proximity touch position, a proximity touch movement state, and/or the like). Information corresponding to the detected proximity touch operation and the proximity touch pattern may be outputted to the touch screen.

The audio output module 152 may convert and output as sound audio data received from the wireless communication unit 110 and/or stored in the memory 160 in a call signal reception mode, a call mode, a record mode, a voice recognition mode, a broadcast reception mode, and/or the like. The audio output module 152 may provide audible outputs related to a particular function performed by the mobile terminal 100 (e.g., a call signal reception sound, a message reception sound, etc.). The audio output module 152 may include a speaker, a buzzer, and/or the like.

The alarm 153 may provide outputs to inform about an event of the mobile terminal 100. The events generated in the mobile terminal 100 may include a call reception, a message reception, key signal inputs, a touch input, etc. In addition to audio or video outputs, the alarm 153 may provide outputs in a different manner to inform about an event. For example, the alarm 153 may provide an output in the form of vibrations. Outputs informing about the occurrence of an event may also be provided via the display 151 and/or the audio output module 152.

The haptic module 154 may generate various tactile effects that the user may feel. Vibration is one example of the tactile effects generated by the haptic module 154. The strength and pattern of the vibration generated by the haptic module 154 may be controlled. For example, different vibrations may be combined to be outputted and/or sequentially outputted.

The haptic module 154 may also generate various other tactile effects such as an effect by stimulation according to a pin arrangement vertically moving with respect to a contact skin, an effect by stimulation according to a spray force or suction force of air through a jet orifice or a suction opening, an effect by stimulation of a contact on the skin, an effect by stimulation of a contact of an electrode, an effect of stimulation using electrostatic force, an effect by reproducing a sense of cold and/or warmth using an element that can absorb or generate heat.

The haptic module 154 may allow the user to feel a tactile effect through a muscle sensation such as fingers or arm of the user, as well as transferring the tactile effect through a direct contact. Two or more haptic modules 154 may be provided based on a configuration of the mobile terminal 100.

The memory 160 may store programs (or the like) used for processing and controlling operations performed by the controller 180, and/or may store input/output data (e.g., a phonebook, messages, still images, video, etc.). The memory 160 may also store data regarding various patterns of vibrations and audio signals to be outputted when a touch is applied to the touch screen.

The memory 160 may include at least one type of storage medium including a flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and/or the like. The mobile terminal 100 may cooperate with a network storage device that performs a storage function of the memory 160 over a network connection.

The interface unit 170 may serve as an interface with any external device connected with the mobile terminal 100. For example, the interface unit 170 may receive data or power from an external device and transmit the same to elements within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating authority of using the mobile terminal 100 and may include a user identity module (UIM), a subscriber identity module (SIM) a universal subscriber identity module (USIM), and/or the like. The device having the identification module (hereafter called an identifying device) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal 100. Various command signals or power inputted from the cradle may operate as signals for recognizing that the mobile terminal 100 is properly mounted on the cradle.

The controller 180 may control general operations of the mobile terminal 100. For example, the controller 180 may perform controlling and processing associated with voice calls, data communications, video calls, and/or the like. The controller 180 may include a multimedia module 181 for reproducing multimedia data. The multimedia module 181 may be configured within the controller 180 and/or may be configured as being separated from the controller 180.

The controller 180 may perform a pattern recognition processing to recognize a handwriting input or a picture drawing input performed on the touch screen as characters or images, respectively.

The power supply 190 may receive external power or internal power and supply appropriate power required for operating respective elements and components under the control of the controller 180.

Embodiments may be implemented in a computer-readable medium using, for example, software, hardware, and/or any combination thereof.

For hardware implementation, embodiments may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform functions described herein. Embodiments may be implemented by the controller 180.

For software implementation, embodiments such as procedures or functions may be implemented together with separate software modules that allow performing of at least one function or operation. Software codes may be implemented by a software application (or program) written in any suitable programming language. The software codes may be stored in the memory 160 and may be executed by the controller 180.

A mobile terminal having a dual-display (i.e., a first touch screen and a second touch screen) may now be described with reference to FIGS. 2A to 5.

The mobile terminal shown in FIGS. 2A to 5 is merely one of various types of mobile terminals having dual-displays. The mobile terminal shown in FIGS. 2A to 5 includes two touch screens that are provided on different bodies, although embodiments are not necessarily limited thereto.

In the mobile terminal having dual-displays, the two touch screens may be separately positioned on a single body, for example. The mobile terminal having dual-displays may include three or more touch screens.

Figure 2A:
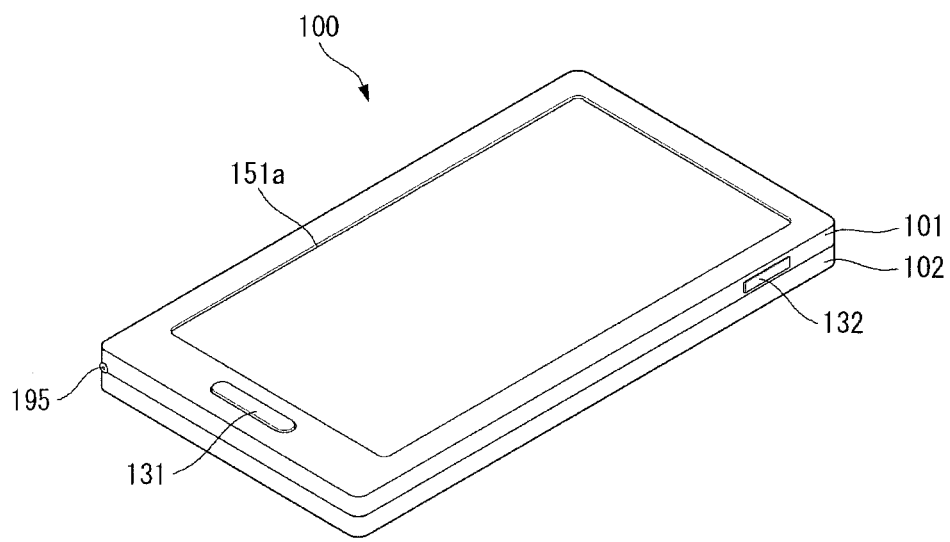
FIGS. 2A and 2B illustrate an external appearance of a mobile terminal having a dual-display according to an example embodiment.
Figure 2B:
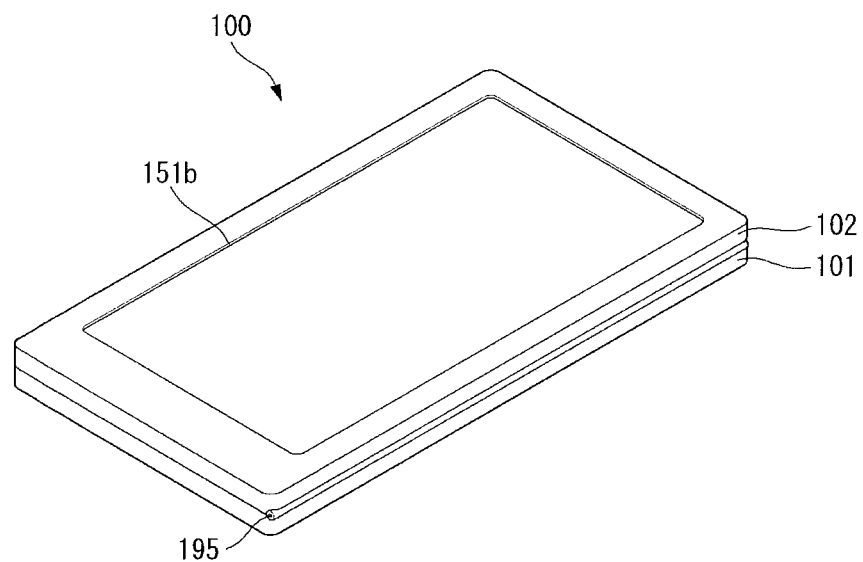
Figure 3A:
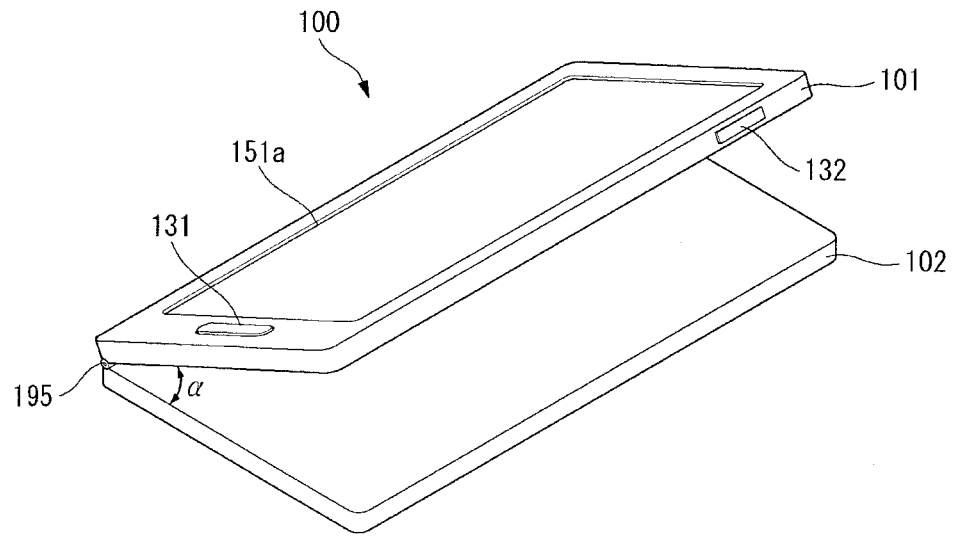
FIGS. 3A and 3B illustrate a folded state of the mobile terminal shown in FIGS. 2A and 2B.
Figure 3B:
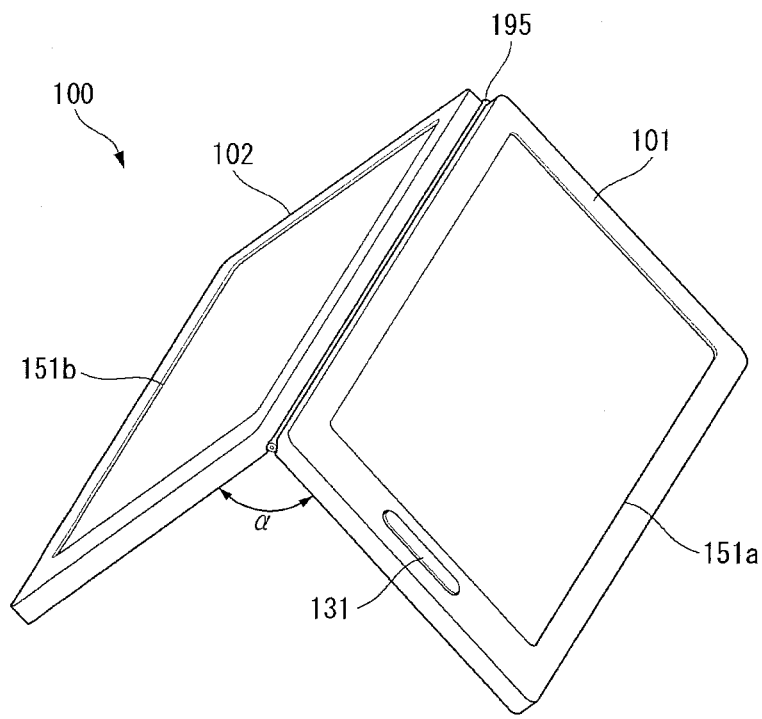
Figure 4A:
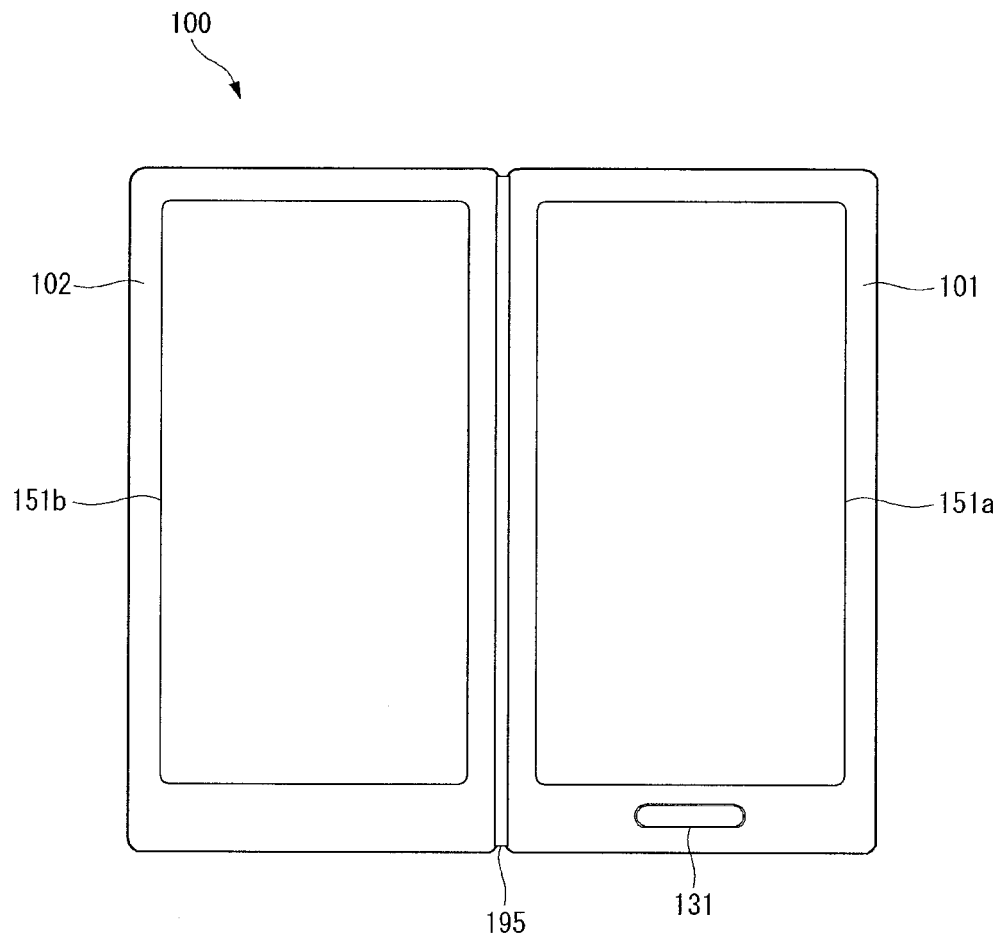
FIGS. 4A and 4B illustrate a completely open state of the mobile terminal shown in FIGS. 2A and 2B.
Figure 4B:
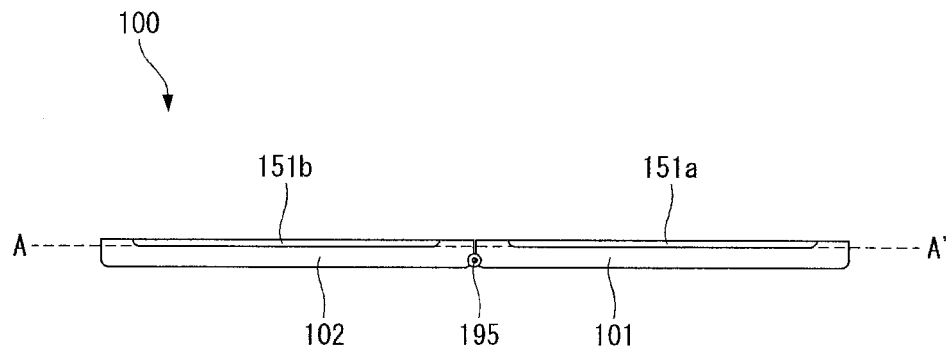

FIGS. 2A and 2B illustrate an external appearance of a mobile terminal having a dual-display according to an example embodiment. FIGS. 3A and 3B illustrate a folded state of the mobile terminal. FIGS. 4A and 4B illustrate a completely open state (or open configuration) of the mobile terminal 100.

The mobile terminal 100 having a dual-display may include a first body 101 having a first touch screen 151*a* and a second body 102 having a second touch screen 151*b*. The first and second bodies 101 and 102 may be fastened by a fastening unit 195 (or a coupling unit).

The first and second bodies 101 and 102 may be fastened in various manners. For example, the fastening unit 195 may fasten the first and second bodies 101 and 102 such that they can be foldable with respect to each other. The fastening unit 195 may also fasten the first and second bodies 101 and 102 such that they can slide relative to each other. Examples may be provided in which the first and second bodies 101 and 102 are fastened by the fastening unit 195 such that they are foldable with respect to each other, although embodiments are not limited thereto.

FIGS. 2A and 2B illustrate a closed status (or closed configuration) of the first and second bodies 101 and 102. FIGS. 3A and 3B illustrate a half open status (or half open configuration) of the first and second bodies 101 and 102. FIGS. 4A and 4B illustrate a fully open status (or fully open configuration) of the first and second bodies 101 and 102. The user may open and close the first and second bodies 101 and 102 as shown in FIGS. 2A to 4B.

An example where the first and second bodies 101 and 102 are in the fully open status may be simply described as the mobile terminal is in an open state (i.e., the mobile terminal is in an open configuration). An example where the first and second bodies 101 and 102 are in the half open status may be simply described as the mobile terminal is in a folded state (i.e., the mobile terminal is in a closed configuration).

The first and second touch screens 151*a* and 151*b* may perform both an information input function (i.e., a function as a user interface) and an information display function. The information input function may be executed in a tactile manner. The first touch screen 151*a* and the second touch screen 151*b* may separately display information in a preview state or in a manipulation-available state.

With reference to FIGS. 2A and 2B, when the terminal 100 is in a closed state (or in a closed configuration), a side facing a surface of the first body 101 where the first touch screen 151*a* is formed and a side facing a surface of the second body 102 where the second touch screen 151*b* is formed are brought into a surface-contact.

With reference to FIG. 4B, when the terminal 100 is in an open state (or in an opened configuration), one surface of the first body 101 where the first touch screen 151*a* is provided and one surface of the second body 102 where the second touch screen 151*b* is provided may be substantially on a same plane (A-A').

A folding operation of the mobile terminal 100 is not limited to the configuration shown in FIGS. 2A to 4D. For example, an angle ($\alpha$) (hereafter called a folding angle) between the first body 101 and the second body 102 may be 0 degrees to 180 degrees, as shown in FIGS. 2A to 4B. In addition, the first and second bodies 101 and 102 may be fastened by the fastening unit 195 such that the folding angle is larger than 180 degrees.

The controller 180 may detect whether the first and second bodies 101 and 102 are open or closed by using the sensing unit 140. The controller 180 may detect the folding angle between the first and second bodies 101 and 102 by using the sensing unit 140.

As shown in FIGS. 2A to 4B, the mobile terminal 100 having a dual-display may include at least one of a first manipulation portion 131 or a second manipulation portion 132. The first and second manipulation units 131 and 132 may be manipulation units included as part of the user input unit 130 and may be implemented as a key button or the like. The mobile terminal 100 may receive a command for controlling operation of the mobile terminal 100 via at least one of the first manipulation portion 131 or the second manipulation portion 132.

Content inputted by the first and second manipulation portions 131 and 132 may be variously set. For example, the first manipulation 131 may receive a command such as a start, an end, a scroll, and/or the like. The second manipulation portion 132 may receive a command such as adjusting a size of a sound volume outputted from the audio output module 152 or changing to a touch recognition mode of the display 151.

Figure 5:
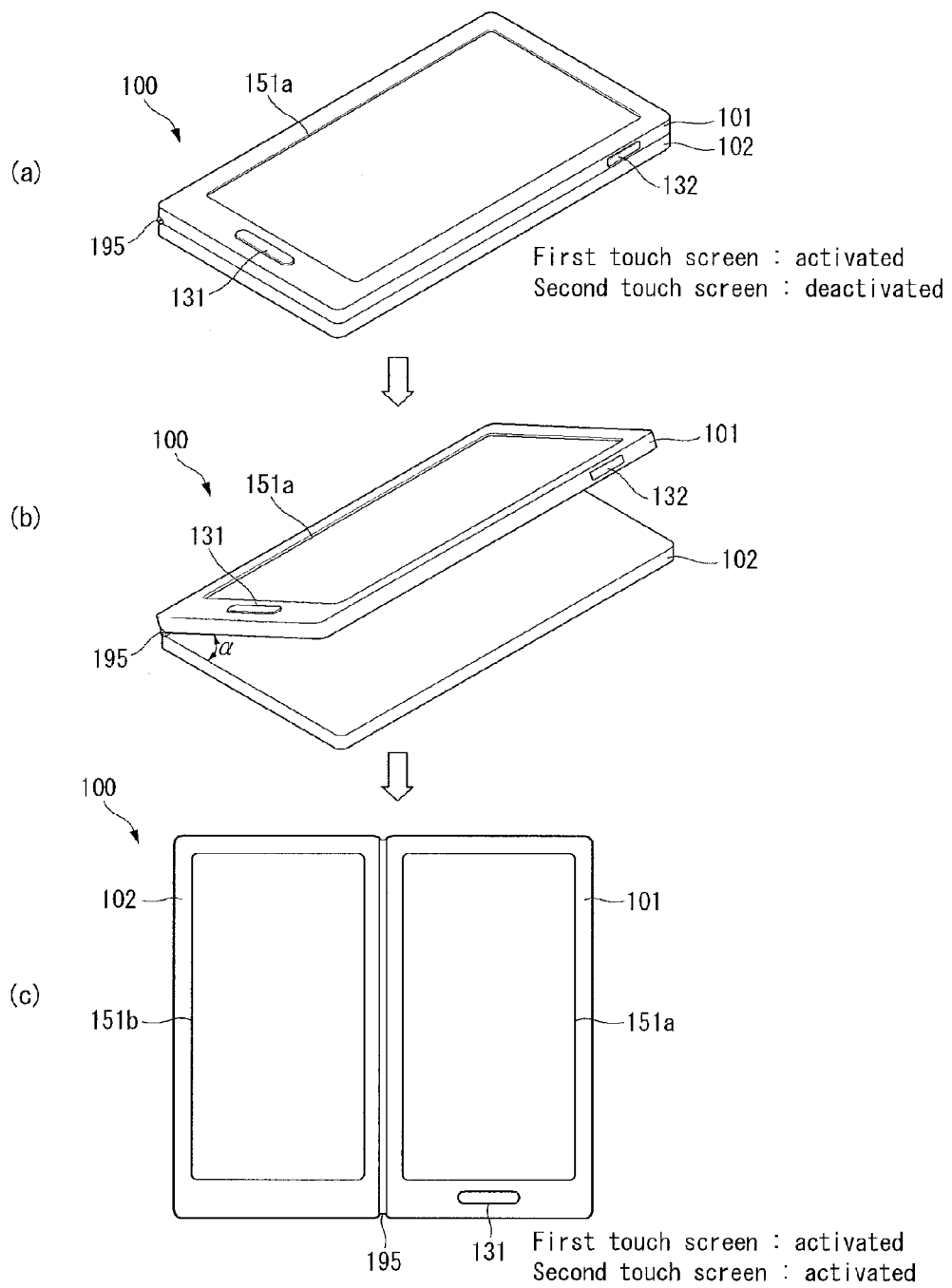
FIG. 5 illustrates transition of folding states of the mobile terminal shown in FIGS. 2A and 2B.

FIG. 5 illustrates transition of folding states of the mobile terminal 100 shown in FIGS. 2A and 2B.

When the mobile terminal 100 having a dual-display is in a closed configuration as shown in FIG. 5, the first touch screen 151*a* may be active (or activated) and the second touch screen 151b may be inactive (or deactivated). Active or activated may correspond to an active state to perform operations, whereas inactive or inactivated may correspond to an inactive state that does not perform operations.

When the first touch screen 151a is not used for a certain time period in the closed configuration, the first touch screen 151a may be deactivated (or inactive). The mobile terminal 100 may also be set such that, in the closed configuration, the first touch screen 151a and the second touch screen 151b may both be inactive (or deactivated). In this example, the first touch screen 151a may be activated when an input is applied to the first touch screen 151a by a particular key button.

When the mobile terminal 100 is fully open (i.e., an open configuration) as shown in FIG. 5(c) through an intermediate state (i.e., the folding state) as shown in FIG. 5(b) according to a folding operation, the controller 180 may activate the second touch screen 151b while maintaining the active state of the first touch screen 151a.

In a folder type terminal with a maximum folding angle of 180 degrees, if the first and second bodies 101 and 102 are sensed to be in a folded state by 150 degrees or larger, the mobile terminal 100 may be determined to be in the open configuration. When the mobile terminal 100 reaches the maximum folding angle, the mobile terminal 100 may be determined to be in the open configuration. A slide type mobile terminal may be determined to be in the open configuration based on a sliding degree between the first body 101 and the second body 102.

Activation/deactivation of the first touch screen 151a and/or the second touch screen 151b corresponding to opening/closing and/or folding angle between the first body 101 and the second body 102 may be different from the FIG. 5 configuration based on an initial setting of the terminal 100, and/or may be set differently by the user.

The mobile terminal 100 and the method for displaying information in the mobile terminal 100 may now be described with reference to FIGS. 7 to 13C.

In the following, the first touch screen 151a is assumed to already be in an active state. Changes in the information display method performed on the display screen when the second touch screen 151b is activated may be described.

Activation of the touch screen may include: 1) activation of an information display function; and/or 2) activation of an information input function. A mobile terminal having a touch screen may be set according to its design such that activation of the information display function and activation of the information input function are discriminately set or the two functions (information display function and information input function) may be activated in conjunction with each other.

Unless otherwise specified with respect to the two functions or unless there is a need to activate the information input function simultaneously when the information display function is activated, a touch screen being activated may indicate activation of the information display function. Such understanding is not meant to exclude an example where both functions are simultaneously activated.

Figure 6:
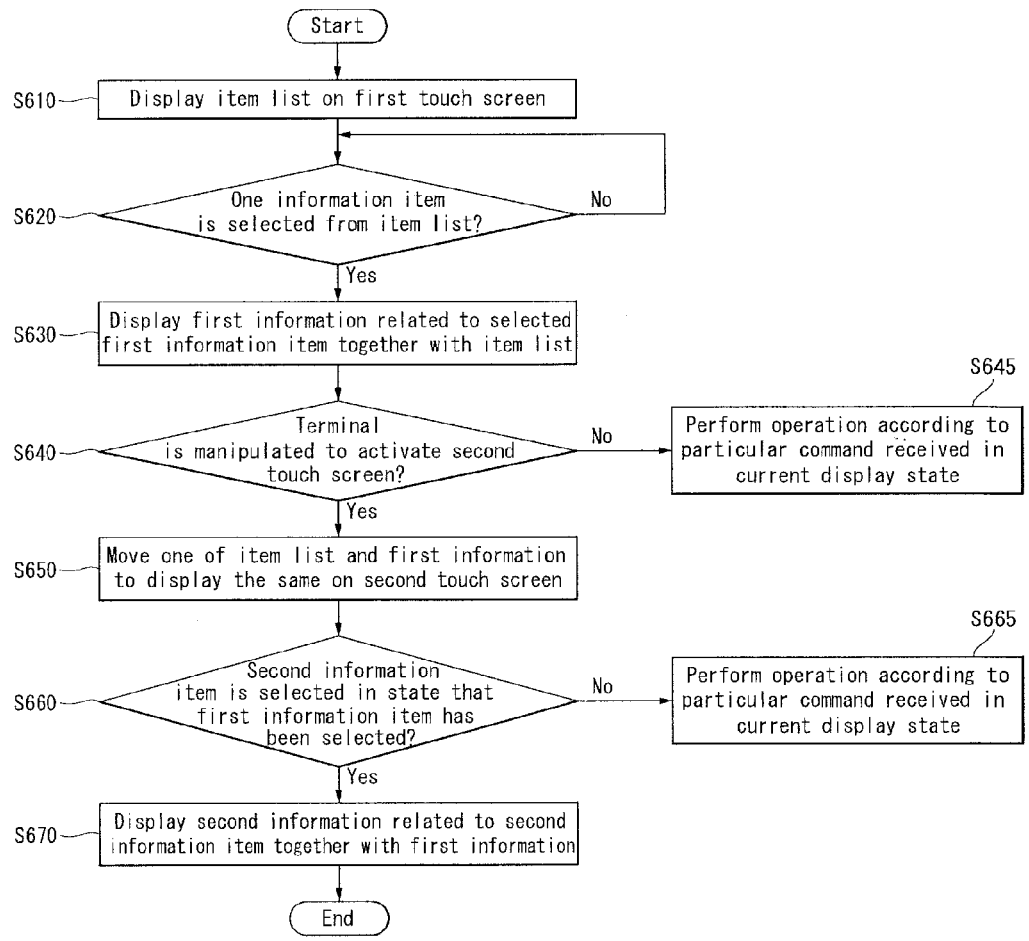
FIG. 6 is a flow chart illustrating a method for displaying information in a mobile terminal according to an example embodiment of the present invention.

FIG. 6 is a flow chart illustrating a method for displaying information in a mobile terminal according to an example embodiment of the present invention. Other embodiments, operations and orders of operation are also within the scope of the present invention.

In the information display method, in a state that the first touch screen is active, the controller 180 may display an item list including a plurality of information items on the first touch screen in operation S610. The displayed information items may correspond to applications.

Figure 7:
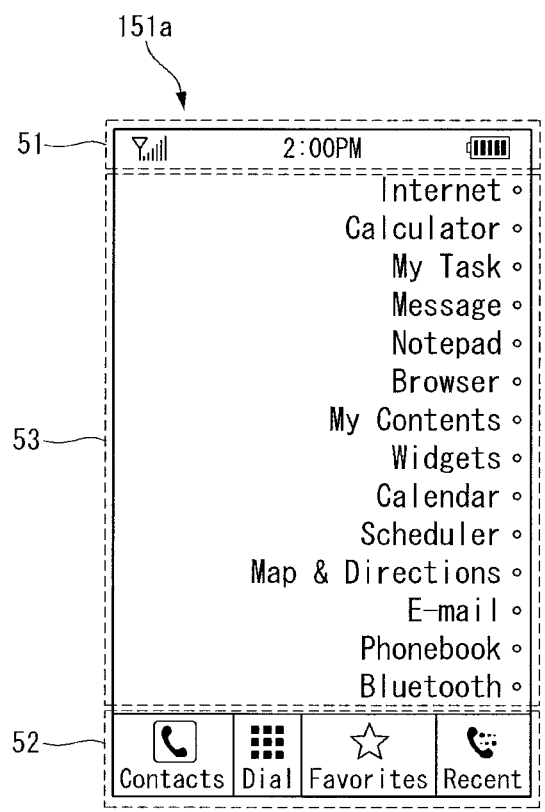
FIG. 7 illustrates an item list displayed on a display screen of a single touch screen.

FIG. 7 shows an example of displaying an item list. More specifically, FIG. 7 shows an item list (or application item list) displayed on the display screen in a single touch screen state. The screen display of FIG. 7 may be an initial screen image displayed as the first touch screen 151a is activated or may be a sub-screen image displayed as a particular command is received from the user (e.g., a selection of a menu item).

A single touch screen state may be a state in which only the first touch screen 151a is active. A dual-touch screen state may be a state in which both the first touch screen 151a and the second touch screen 151b are active.

With reference to FIG. 7, in the single touch screen state, the item list including a plurality of information items may be displayed at a display region 53 (hereafter called an item display region) in operation S610. More specifically, the item list may be provided at a right portion within an item display region 53 while excluding an indicator region 51 at an upper portion of the screen and a speed key display region 52 at a lower portion of the screen.

An information item may refer to items indicating text or image (e.g., icons, thumbnail images, etc.) representing content of specific information (e.g., functions, operations, states, attributes, etc.) upon integrating or abstracting of the content.

Four icons may be displayed at the speed key display region 52. An icon indicating a Received Signal Strength Indication (RSSI), a text indicating a current time and an icon indicating a remaining battery capacity may be displayed at the indicator region 51. Each of these icons or text may correspond to information items.

The following description may focus on the item list including the plurality of information items displayed at the right portion of the item display region 53 (in FIG. 7). The item list in FIG. 7 may include the plurality of information items arranged in a row at the right portion, and each of the information item may be displayed as text.

A position of a region of the screen at which the item list is displayed, an arrangement form of the information items in the region of the screen, and a display format of the information items may vary.

The item list may be displayed at portions other than the right portion in the item display region 53. These other portions include a left portion, an upper portion or a lower portion in the item display region 53. The plurality of information items included in the item list may also be two-dimensionally arranged (e.g., N×M matrix form, etc.) rather than arranged by one row. The plurality of information items may also be displayed as images such as icons, thumbnail images, and/or the like related to the corresponding information items, rather than as text, and/or the plurality of information items may be displayed as a combination of text and image. For ease of description, the item list may hereafter be described as being displayed as text in a row at a right portion of the item display region 53 as shown in FIG. 7.

In FIG. 7, the plurality of information items included in the item list are merely illustrative. In FIG. 7, the information items include fourteen information items from the 'Internet' item displayed at the uppermost portion to the 'Bluetooth' item displayed at the lowermost portion. The information items included in the item list may be previously set, may be realigned according to use frequency, a latest usage order, and/or the like, and/or may be added or reconfigured based on a user selection.

In a single touch screen state in which the item list including the plurality of information items is displayed, when one information item is selected from the item list as in operation S620 (FIG. 6), the controller 180 may display, in operation S630, particular information associated with the selected information item together with the item list on the first touch screen 151a.

For ease of illustration, the one information item selected from the item list may be referred to as a first information item and the particular information associated with the selected first information item may be referred to as a first information. The first information may be displayed in one of the preview state or the manipulation-available state.

Figure 8A:
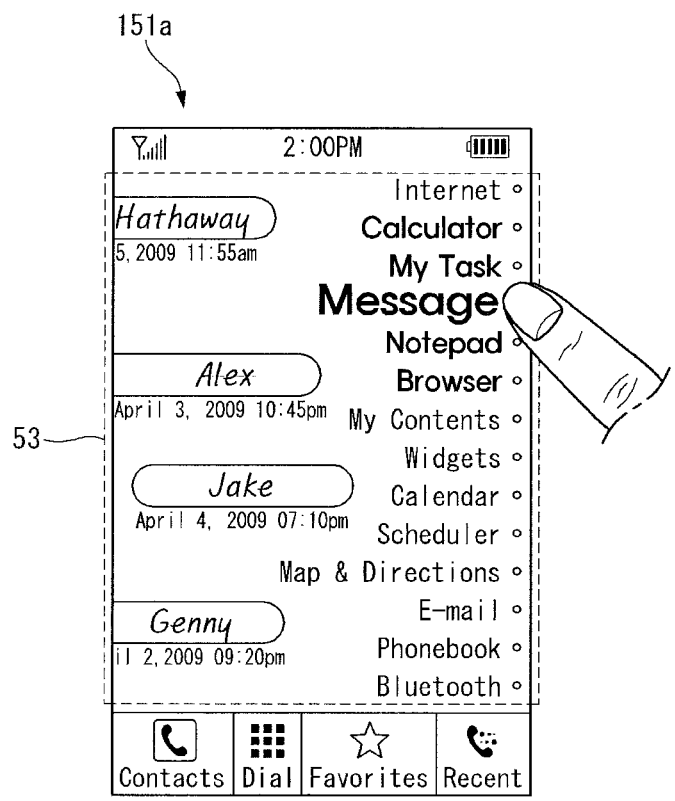
FIGS. 8A and 8B illustrate display screens when a first information item is selected in a single touch screen state.
Figure 8B:
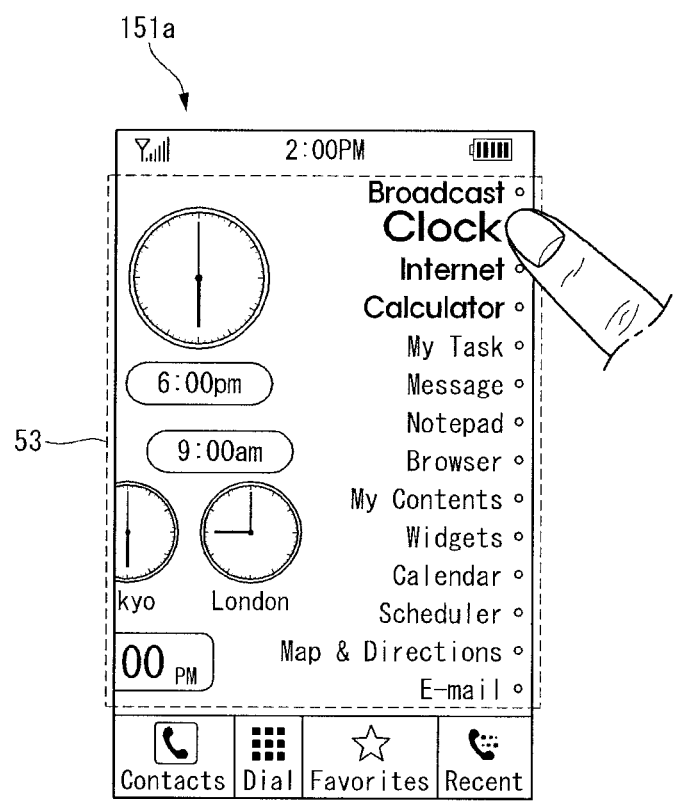

FIGS. 8A and 8B show selecting of an information item being performed through a touch operation by the user on the single touch screen. The touch operation may include both a contact touch and a proximity touch.

Selecting of an information item may also be performed by a user manipulating a keypad using an up/down key, a direction key, a select key, and/or the like. The selecting of an information item or relevant information may be performed through a touch operation on the touch screen.

The term selecting of an information item or relevant information may be understood and construed from a view point of the terminal 100. That is, the selecting of an information item or its relevant information may mean that a particular event can be recognized as a behavior of selecting of an information item or its relevant information based on a touch operation by the user that has occurred in the terminal, regardless of a user's intention or view point.

Examples relating to operations S620 and S630 may be shown in FIGS. 8A and 8B. FIGS. 8A and 8B illustrate display screens when the first information item is selected in the single touch screen state.

FIG. 8B shows a display screen image after the user performs a touch operation (e.g., a scrolling or a flicking operation) to display the information item (i.e., 'clock') that can not be displayed in FIG. 8A due to limitation in size of the display screen.

For example, as shown in FIG. 8A, if an information item 'Message' is selected as a first information item, the controller 180 may display particular information associated with the selected 'Message' item together with the item list on the single touch screen. If the item 'Clock' is selected as a first information item as shown in FIG. 8B, the controller 180 may display particular information associated with the selected 'Clock' item together with the item list on the single touch screen.

With reference to FIG. 8A, the selected 'Message' item may be highlighted as compared to the other displayed information items. This may visually inform the user that the particular information item has been selected. In FIG. 8B, the selected 'Clock' item may be highlighted in a similar manner.

In FIG. 8A, some information items (i.e., 'Calculator', 'My Task', 'Notepad', 'Browser') adjacent to the selected 'Message' item may also be highlighted so as to discriminate from other information items (e.g., 'Internet', 'My Contents', 'Widgets', etc.) on the item list. In the example shown in FIG. 8B, some information items (i.e., 'Broadcast', 'Internet', 'Calculator') adjacent to the selected 'Clock' item may be highlighted so as to discriminate from other information items ('My Task', "Message', etc.). This may provide user convenience when the user later selects another information item positioned near the selected information item.

In FIG. 8A, information about a lately sent (i.e., originated) messages may be illustrated as first information associated with the selected 'Message' item. The origination message information may be sorted by recipient. In FIG. 8B, information about time and alarm of each country may be illustrated as the first information associated with the selected 'Clock' item.

The examples shown in FIGS. 8A and 8B are merely illustrative. First information to be displayed on the display screen in relation to the selected first information item may vary. The first information to be displayed on the display screen in relation to the selected first information item may be previously set in the mobile terminal 100 based on a type, an attribute, a layer, and/or the like, of the selected information item. For example, the first information may include at least one of an application or content previously designated as being associated with the first information item.

The first information may be re-sorted according to a preset sorting method (e.g., various sorting methods such as usage frequency order, a latest usage order, an importance order, senders, recipients, dates, and/or the like) and/or may be reconfigured according to a user selection.

In operation S630 (FIG. 6), the controller 180 may display the first information in a form of brief information on the display screen. For example, in FIG. 8A, the 'origination message information' displayed as first information at the left portion of the item display region 53 and associated with the selected 'Message' item may be brief information showing only origination dates (e.g., 'Apr. 3, 2009, 10:45 p.m.') and/or recipients (e.g., 'Alex').

The brief information may be displayed because of restriction of display space that can be generated in the single touch screen state. Thus, if there is no restriction in the display space, the first information may be displayed in a form of detailed information. In addition, the information amount of the first information to be displayed may change based on size of the display space that can be secured for displaying the first information in the single touch screen state in operation S630.

In operation S630, the controller 180 may display the first information in a preview state. The preview state may be a state that provides images or text without allowing a user to input additional information, move the information to be associated with another information item or output the information to be associated with another information item (other than by displaying). The images may be called preview images.

In FIG. 7, the item list may be displayed at the right portion of the item display region 53. Thereafter, as shown in FIG. 8A, when the 'Message' item is selected from the item list based on an intermediate touch of the user, a preview image regarding the first information associated with the selected 'Message' item may be displayed at the left portion of the item display region 53.

The preview image regarding the origination message information may disappear from the left portion of the item display region 53 when the user takes his finger (or pointer) off of the displayed 'Message' item. The mobile terminal 100 may change to the display state shown in FIG. 7.

Thereafter, if the 'My Contents' item is selected from the item list based on an intermediate touch of the user, a preview image displaying the first information associated with the selected 'My Contents' item may appear at the left portion of the item display region 53. In this example, when the user takes off his finger (or pointer), the preview image regarding the first information associated with the 'My Contents' item may immediately disappear. While the user's touch regarding the corresponding information item is maintained, displaying of the corresponding preview image may be maintained.

As the information items selected from the item list change, the controller 180 may change preview images according to information associated with the selected information item based on change in the selected information items. As shown, in FIG. 8A, the display information at the left portion of the item display region 53 may change based on a change of the selected information item.

In the above description, an example has been described where the selected information items change based on the user's intermittent touch movement. If there is a continuous touch movement on the touch screen by the user, then preview images may be successively changed based on the continuous touch movement. The change in the preview images (namely the corresponding preview images appear and disappear based on change of the selected information item) may occur in synchronization with a speed of the continuous touch movement.

In the above description, a contact touch on the touch screen is assumed while the contact touch is maintained (i.e., the user's finger is not taken off), displaying of the preview image is maintained, and when the contact touch is released (i.e., the user's finger is taken off), then the preview image may disappear. However, selecting of an information item or relevant information according to a touch operation may be performed by a different method.

For example, a change in the preview image according to a touch movement (i.e., appearing and disappearing) may occur according to a proximity touch by the user. In this case, when selecting of an information item is made by a contact touch, although the user takes off his finger (or other pointer), then the preview image may be maintained by being displayed as it is (rather than disappearing).

A determination of whether displaying of the first information is to change (e.g., changing of the preview image) or whether displaying of the first information is to be maintained (e.g., displaying of the preview image) may be determined by whether an intermediate touch is a short touch or a long touch, by whether a touch pressure is strong and weak, and/or by whether a single touch or a double touch is provided.

For example, if an information item is selected by a long touch, if an information item is selected by a strong touch pressure or if an information item is selected by double touches performed in a similar manner to double clicks, the displaying of first information associated with the selected information item may be maintained even though the user takes his finger off. Releasing of the selected information item may be performed in a similar manner. For example, in case of an information item selected through double touches, when the selected information item is double-touched one more times, the selection of the information item may be released.

In FIGS. 8A and 8B, in the single touch screen state, the item list may be displayed at the right portion of the item display region 53 and the first information associated with the selected information item may be displayed at the left portion of the item display region 53. However, this is merely illustrative. That is, the item list may be displayed at an upper portion of the item display region 53 and the first information may be displayed at the lower portion of the item display region 53, and/or vice versa. Various other display methods may also be provided.

In FIGS. 8A and 8B, the regions each displaying the item list and the first information do not overlap, although they may overlap as long as an information item may be selected from the item list or content of the first information may be checked.

According to the information display method, when the mobile terminal changes from the single touch screen state to a dual-touch screen state as the mobile terminal is manipulated to activate the second touch screen in operation S640, the controller 180 may move one of the item list or the first information displayed on the first touch screen 151*a* to display the one of the item list or the first information on the second touch screen 151*b* in operation S650.

For example, the second touch screen 151*b* may be activated when the terminal 100 is manipulated from the closed configuration as shown in FIG. 5(*a*) to the open configuration as shown in FIG. 5(*c*). In case of a slide type terminal, the slide type terminal may be manipulated such that a first body having a first touch screen and a second body having a second touch screen are slidably moved to allow the second body to be separated from the first body to activate the second touch screen. The second touch screen may also be activated based on an input of a particular key. The following description may be focused on an example where the mobile terminal 100 is manipulated into the open configuration as shown in FIG. 5(*c*).

The description may focus on an example where the single touch screen state changes to the dual-touch screen state, although if the single touch screen state is maintained an operation according to a particular command received by the mobile terminal 100 may be performed based on a corresponding display state in operation S645.

In the present example, the description may focus on an example where the single touch screen state (of the first touch screen 151*a*) is changed to the dual-touch screen state (of the first and second touch screens 151*a* and 151*b*), although other examples may also be provided. For example, if the mobile terminal 100 has three or more touch screens, a single touch screen state by one of the touch screens may be changed to a dual-touch screen state by the other two touch screens.

Figure 9A:
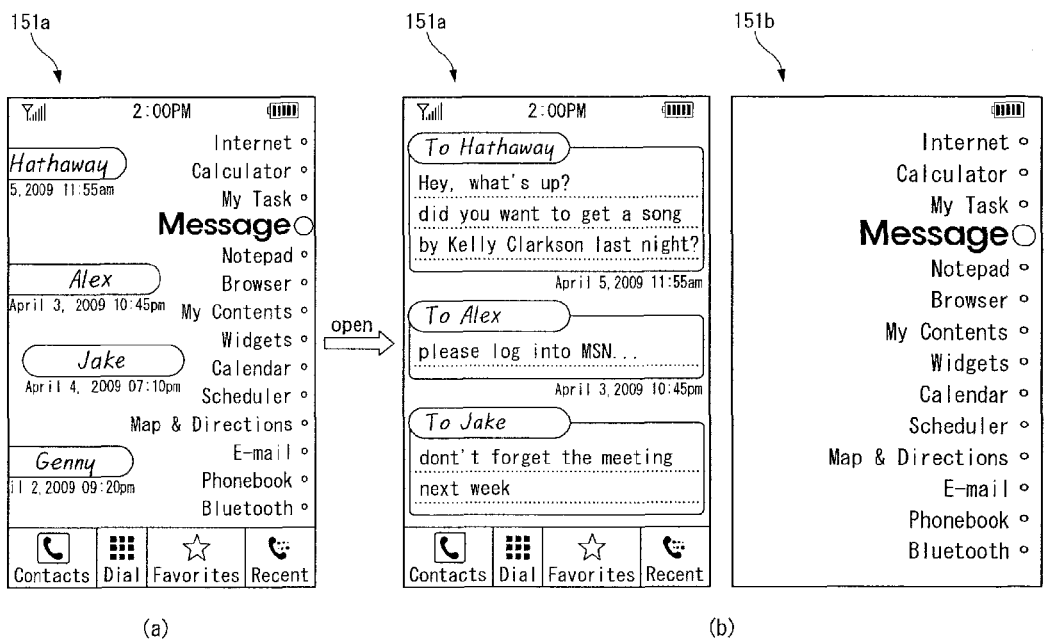
FIGS. 9A and 9B illustrate display screen images that change from a single touch screen state to a dual-touch screen state.
Figure 9B:
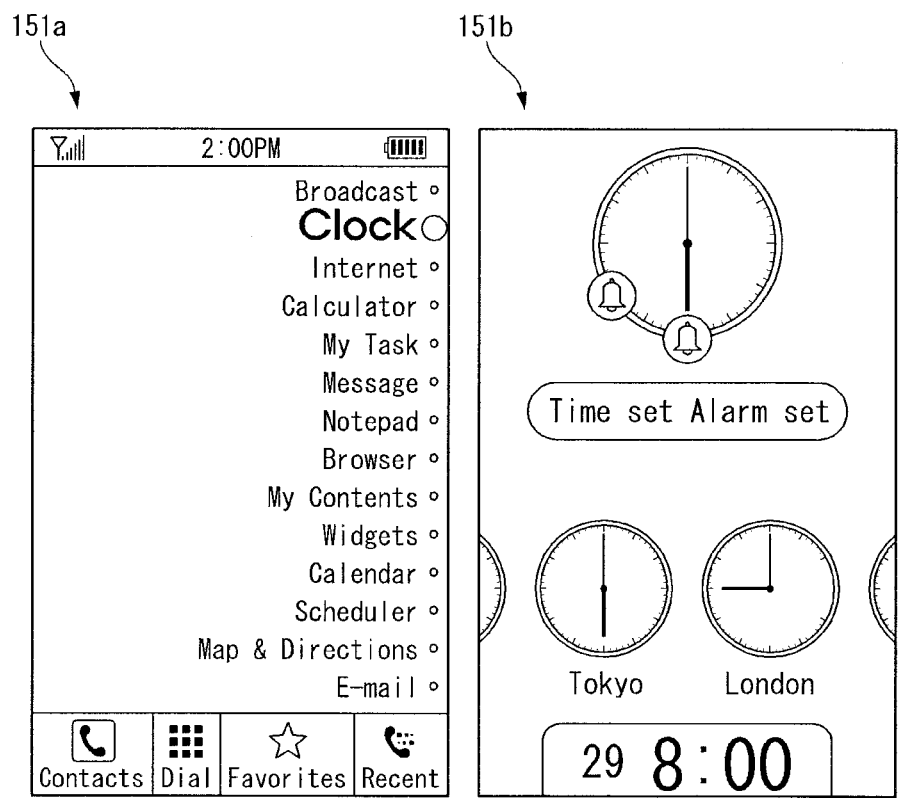

Examples regarding operations S640 and S650 may be shown in FIGS. 9A and 9B. FIGS. 9A and 9B illustrate display screen images that change based on a change from the single touch screen state to a dual-touch screen state. More specifically, FIG. 9A(a) illustrates the single touch screen state and FIG. 9A(b) illustrates the dual-touch screen state that changed from the single touch screen state of FIG. 9A(a). FIG. 9B illustrates the dual-touch screen state that changed from the single touch screen state of FIG. 8B.

The relative positions of the first touch screen 151*a* and the second touch screen 151*b* in the dual-touch screen state shown in FIGS. 9A and 9B are merely illustrative, and the figures are not indicating actual positions (i.e., physical/spatial positions) of the first touch screen 151*a* and the second touch screen 151*b*.

In FIG. 9A, the first information refers to the origination message information displayed at the left portion of the item display region 53 based on the selection of the 'Message' item as the first information item. With reference to FIG. 9A, in the single touch screen state, the item list and the first information may be displayed together. As the mobile terminal 100 changes from the single touch screen state to the dual-touch screen state, the item list may move to be displayed on the second touch screen 151*b*.

In FIG. 9A, the item list may be moved to be displayed on the second touch screen 151*b*, although other embodiments may also be provided. That is, the first information (and not the item list) may move to be displayed on the second touch screen 151*b* while the item list is displayed on the first touch screen 151*a*, as shown in FIG. 9B.

In operation S650, the first information to be displayed on one of the dual-touch screen may be the same as the first information that has been displayed in the single touch screen state in operation S630, or the first information may be different in at least one of an amount of the information and an attribute of the information.

For example, referring to a difference in the amount of information, if the first information displayed in operation S630 has a form of brief information, the first information displayed in operation S650 may have a form of detailed information. In the example of FIG. 9A, the first information displayed on the first touch screen 151*a* in the dual-touch screen state may include detailed content regarding the origination message. In this example, the change in the amount of information may lead to a change in display size of the first information.

Based on the attribute of information, if the first information displayed in operation S630 is in a preview state in which the first information may not be manipulated to be selected and/or executed, the first information may be displayed in a manipulation-available state in which the first information may be manipulated by being selected and/or executed in operation S650. For example, in operation S630, only the item list may be manipulated by being selected, scrolled, and/or flicked while the first information may be displayed only in the preview state (in which the information may not be manipulated). In operation S650, the first information as well as the item list may both be manipulated.

In FIG. 9A(b), if the information regarding one of the recipients (e.g., 'Alex') among the first information displayed on the first touch screen 151*a* is touched, a message writing window having the selected person as a recipient may be displayed or information may be displayed in a pop-up manner. This information is provided in a manipulation-available manner that allows additional information to be provided.

Additionally, as shown in FIG. 9A(b), if particular information (e.g., the display window including origination message content regarding 'Hathaway') is touched, the corresponding display information may be magnified by being displayed such as by zooming-in without changing content of the information. Still further, as shown in FIG. 9A(b), if the first touch screen 151*a* is scrolled and/or flicked from left to right, the first information may change from the origination message information to reception message information so as to be displayed on the first touch screen 151*a*.

In FIG. 9B, alarm information of the first information displayed on the second touch screen 151*b* may be touched to enter (or display) a screen image in which an alarm setting function may be executed and the alarm may be set. Various other manipulations may also be performed.

Such content (i.e., an amount of information and a change in the attribute) may be applied in a similar manner for an example where the item list is displayed in the dual touch screen state.

Although not shown in FIGS. 9A and 9B, in operation S650, movement of one of the item list or the first information to the second touch screen 151*b* may be performed as will be described.

For example, in FIG. 9A, when the mobile terminal 100 changes to the dual-touch screen state (such as by activating the other touch screen), the item list may move as if the item list instantly jumps from the first touch screen 151*a* to the second touch screen 151*b*. In FIG. 9A, when the terminal changes to the dual-touch screen state (by activating the second touch screen 151*b*), the item list may move from the first touch screen 151*a* to the second touch screen 151*b*.

In the dual-touch screen state, if a second information item is additionally selected from the item list while the first information item is still selected in operation S660, the controller 180 may display second information associated with the selected second information item on a same touch screen on which the first information is already displayed in operation S670. When a second information item is selected from the displayed item list, the controller 180 may display a second information associated with the selected second information on a same touch screen that displays the first information in the manipulation-available state (that allows information to be input).

Additional selection of another information item when or while one information item of the item list is selected may be referred to as a multi-selection. If such multi-selection does not occur, an operation according to a particular command received by the mobile terminal 100 may be performed based on a corresponding display state in operation S665.

Operations S660 and S670 may be understood from a description of FIGS. 10A to 10D. FIGS. 10A to 10D illustrate display screen images that change based on multi-selection of information items in the dual-touch screen state.

Figure 10A:
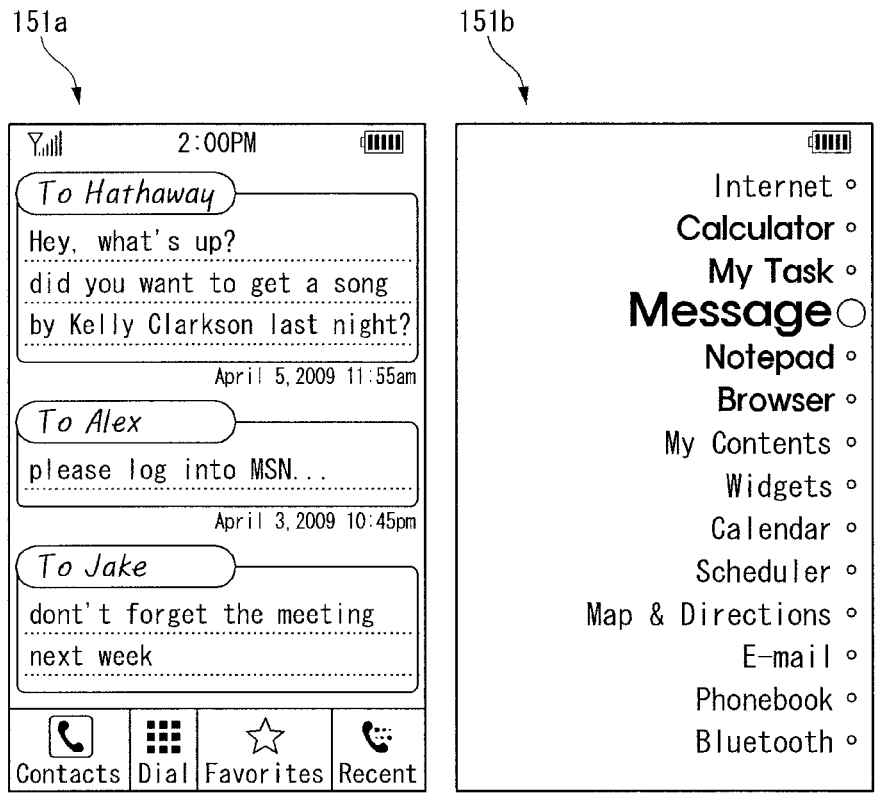
FIGS. 10A to 10D illustrate display screen images that change according to multi-selection of information items in a dual-touch screen state.

FIG. 10A illustrates an example where a first information item is selected from the item list in the dual-touch screen state. The information item to be selected in FIG. 10A may be different from FIG. 9A, although the same 'Message' item may be selected in both cases.

Figure 10B:
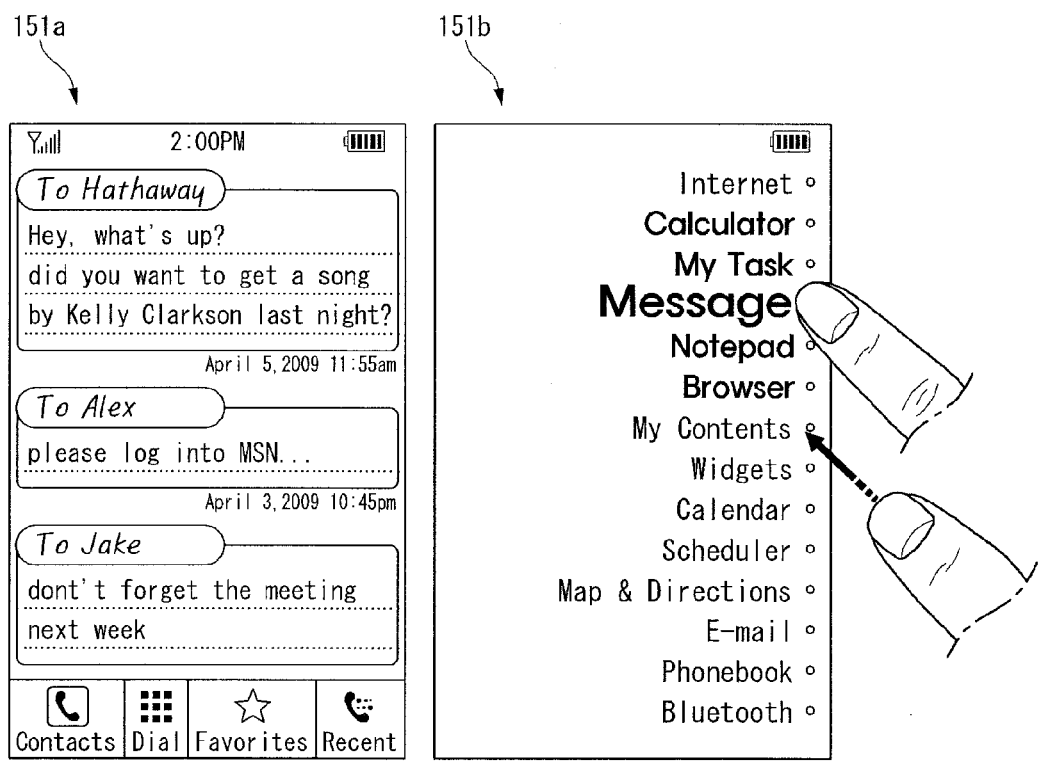
Figure 10C:
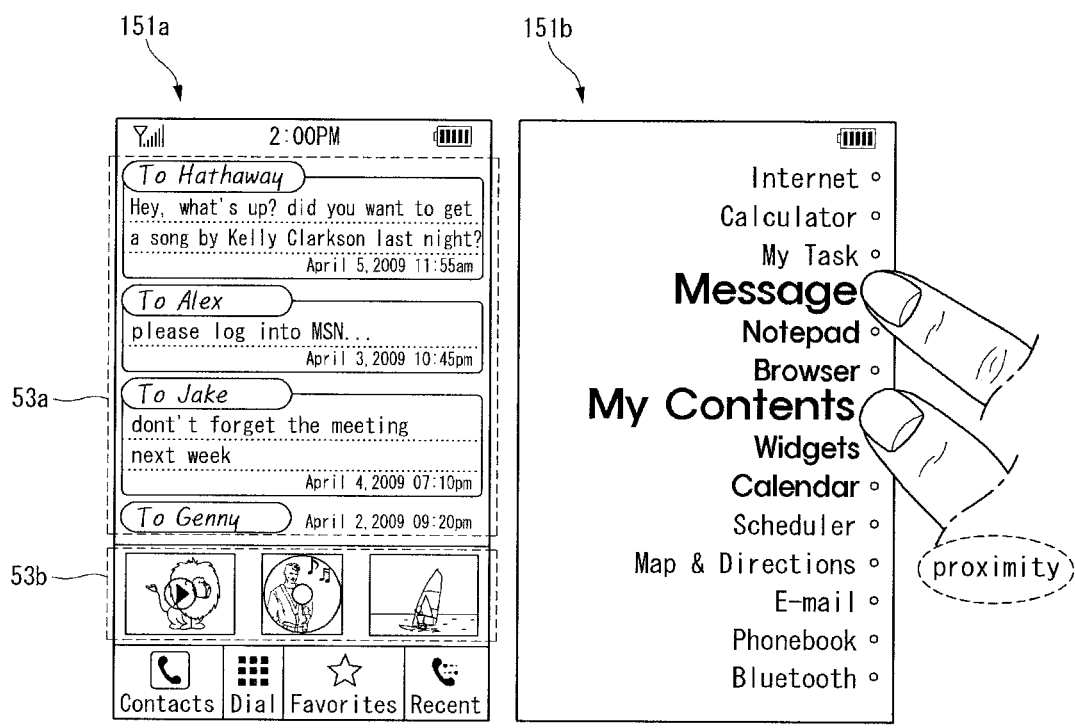

When a contact touch on the 'Message' item (as the first information item) is maintained as shown in FIG. 10A, the user may use another finger, as shown in FIG. 10B to additionally select the 'My Contents' item (as the second information item) through a proximity touch operation, as shown in FIG. 10C.

When multi-selection is performed as shown in FIG. 10C, the controller 180 may display the second information associated with the subsequently selected 'My Contents' item together on the first touch screen 151*a* on which the first information related to the first selected 'Message' item is already displayed.

As shown in FIG. 10C, the first information may be displayed in one region 53*a* of the first touch screen 151*a* while the second information may be displayed in another region 53*b* of the first touch screen 151*a*. The region where the first information is displayed may be referred to as the first information display region 53*a* and the region where the second information is displayed may be referred to as the second information display region 53*b*.

Size and display positions of the respective display regions (i.e., the first information display region 53*a* and the second information display region 53*b*) are merely illustrative as various modifications may also be provided.

When the second information is displayed together with the first information on a same touch screen in operation S670, the size of the region where the first information is to be displayed may be reduced as compared with the size of the region in operation S650. The first information displayed in operation S670 may be different in amount, attribute, display size, and/or the like, of the information from the first information displayed in operation S650. For example, the first information displayed on the first touch screen 151*a* in FIG. 10C may be smaller in size as compared with the first information displayed on the first touch screen 151*a* in FIG. 10A.

For recognition of a proximity touch, the touch screen (i.e., the second touch screen 151*b*) on which the item list is to be displayed may include the proximity sensor 141 to sense a contactless touch operation at a proximity distance.

Figure 11:
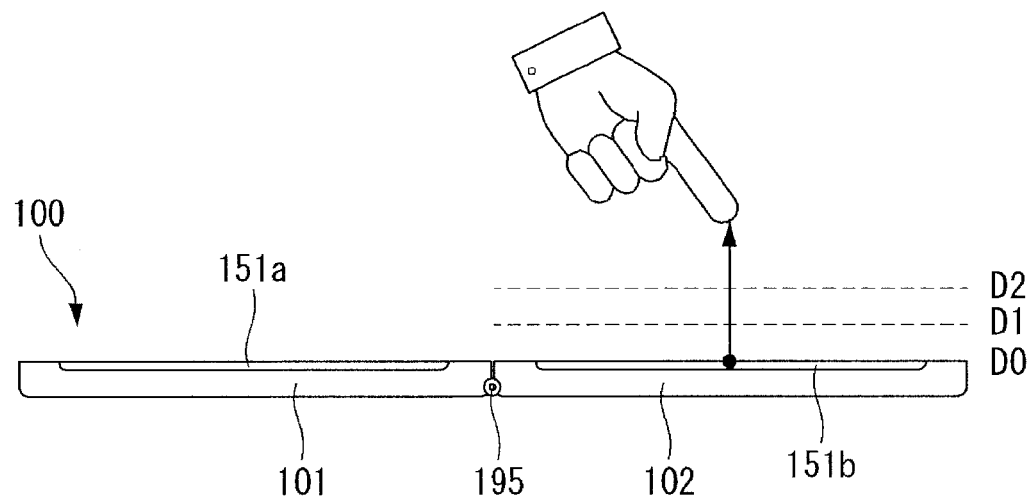
FIG. 11 is a view for explaining a proximity depth of a proximity sensor.

FIG. 11 is a conceptual view for explaining a proximity depth of a proximity sensor. Other arrangements may also be provided.

FIG. 11 shows that a section of a touch screen with a proximity sensor may sense two proximity depths. The proximity sensor 141 may also sense three or more proximity depths.

As shown in FIG. 11, when a pointer such as the user's finger (or a stylus or a pointer) approaches the touch screen, the proximity sensor provided within or near the touch screen may sense the pointer and provide a proximity signal. The proximity sensor 141 may output different proximity signals based on distance (e.g., a proximity depth) between the proximity-touching pointer and the touch screen.

When the pointer is spaced from the touch screen by a distance greater than distance D1 but less than a distance D2, this may be called a proximity touch at a first proximity distance. If the pointer is spaced by a distance less than the distance D1, this may be called a proximity touch at a second proximity distance. If the pointer is brought into contact with the touch screen (at a distance D0), this may be called a contact touch. If the pointer is spaced by greater than a distance D2 on the touch screen, this may be recognized that the proximity touch has been released.

Accordingly, the controller 180 may recognize proximity touches as various input signals based on proximity distances and proximity positions of the pointer with respect to the touch screen. The controller 180 may control various operations based on the various input signals.

Selecting of the second information item by proximity touch may be performed using the following method.

For example, when selection of the first information item is maintained, if the second information item is selected by a proximity touch at the first proximity distance, the second information associated with the second information item may be displayed in a preview state together with the first information. The first information may be displayed in the manipulation-available state while the second information may be displayed in the preview state that may not be manipulated.

If the second information item is selected by a proximity touch at the second proximity distance or by a contact touch, the second information associated with the second information item may be displayed in a manipulation-available state together with the first information. In this example, both the first information and the second information may be displayed in the manipulation-available state that allows a user to input additional information (such as text and images), move information to associate with other applications or output information to another application of the mobile terminal 100.

When selecting by the proximity touch at the first proximity distance, the second information may be displayed in a form of brief information, and when selecting by the proximity touch at the second proximity distance, the second information may be displayed in a form of detailed information. The example based on the proximity touch at the first proximity distance and the example based on the proximity touch at the second proximity distance may be discriminated to vary a size of the screen region where the second information is to be displayed.

Regardless of a difference in proximity distance, when the recognized second information item changes based on movement of the proximity touch, the second information may change based on change of the selected information item. When there is a movement in a proximity touch, the controller 180 may display at least one of the information items (i.e., 'Notepad', 'Browser', Widgets', 'Calendar', etc.) near a position corresponding to movement of the proximity touch such that the information item may be highlighted.

In FIGS. 10A to 10C, multi-selection may be performed by a combination of a contact touch and a proximity touch. In FIGS. 10A to 10C, a multi-selection may occur when there is a proximity touch for selecting the second information item and when the contact touch for selecting the first information item is maintained. However, multi-selection of information items may not always be necessarily performed in this manner.

Multi-selection may also be performed only through contact touches or only through proximity touches.

A touch for selecting the first information item may be made by a contact touch such as a long touch or a double-touch. Although the user takes his finger off, the display screen image regarding the first information may be maintained on the touch screen based on settings of the mobile terminal 100. This may not correspond to an example where the touch itself is maintained, but it may correspond to an example where selecting of the first information item is maintained, as shown in FIGS. 10A to 10C.

Figure 10D:
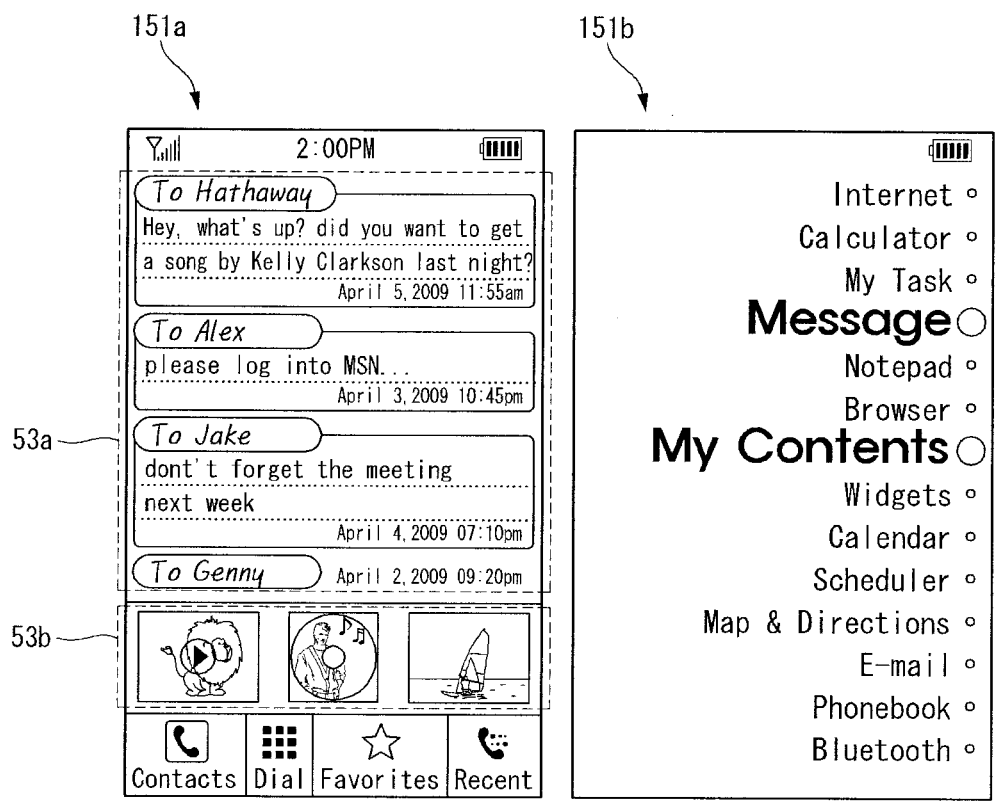

As shown in FIGS. 10A to 10C, multi-selection may be provided even if a second touch is not made while the first touch is maintained. When the multi-selection is performed, a display screen image, as shown in FIG. 10D, may be displayed. In case of multi-selection as shown in FIGS. 10A to 10C, when the user takes off both fingers, the display screen image as shown in FIG. 10D may be displayed.

For ease of convenience of multi-selection in operation S660, the following change may occur on the display screen after the first information item is selected.

When the first information item is selected, displayed information items that relate to (i.e., interwork with) the selected first information may be highlighted (or otherwise identified). The information items that can interwork with the selected first information item (or those that may not) may be discriminately displayed to provide user convenience for multi-selection.

Figure 12:
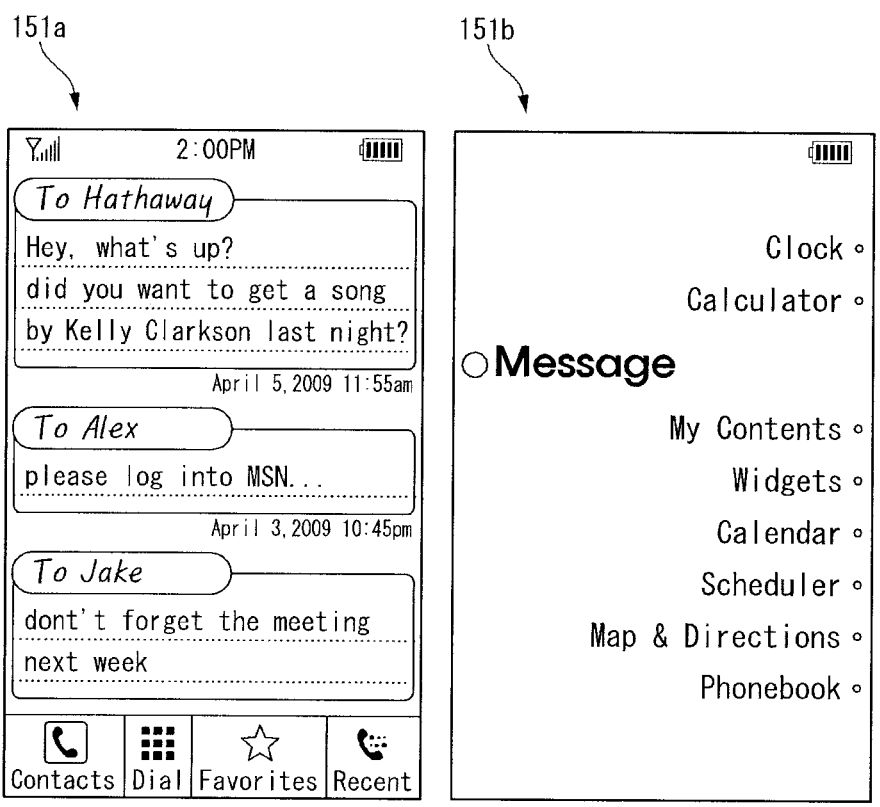
FIG. 12 illustrates a display screen image after one information item is selected in a dual-touch screen state.

Highlighting the display may occur without changing a structure of the item list. For example, highlighting items may occur by changing the display structure of the item list, rearranging a sorting order of the information items included in the item list, and/or by rearranging and displaying only information items that can interwork with the first information item. As one example, FIG. 12 shows that when the 'Message' item is selected (as the first information item), then only the information items that interwork with the 'Message' item may be displayed on the second touch screen 151b. Interworking relates to an ability of an executing application (such as the 'Message' item) to receive information from another application (such as the 'Phonebook' item).

The information items that can interwork with the selected particular information item may be previously set, and/or may be set by the user's adding or selection.

Figure 13A:
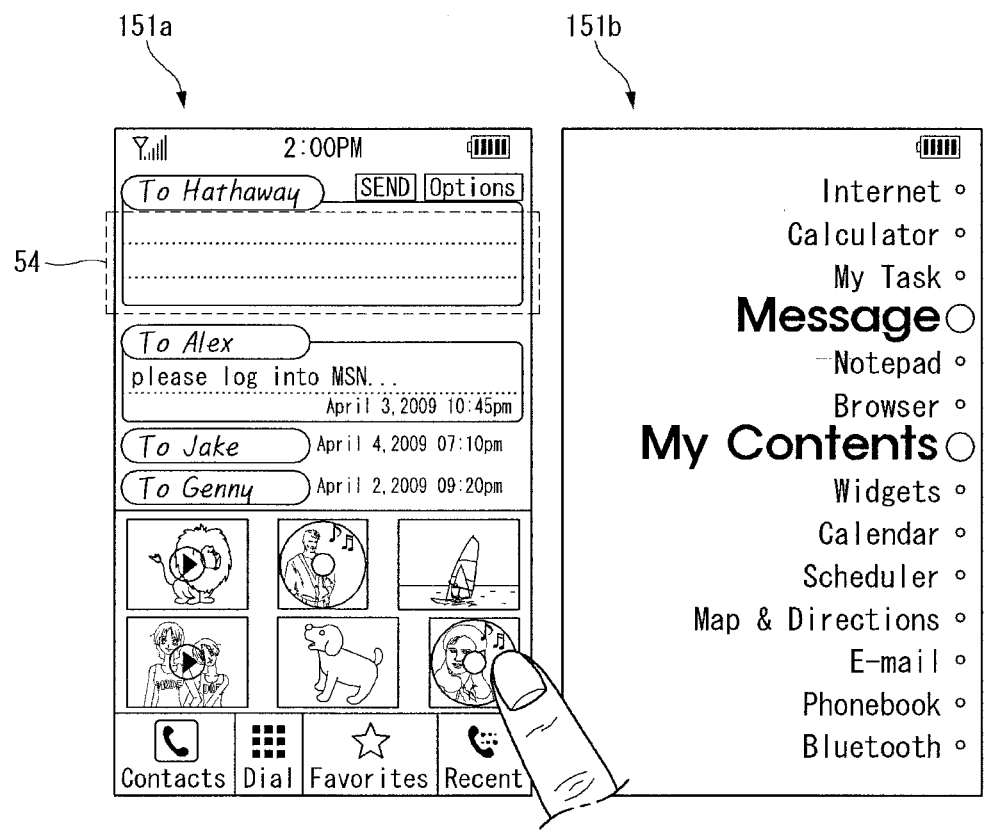
FIGS. 13A to 13C illustrate using information after information items are multi-selected.
Figure 13B:
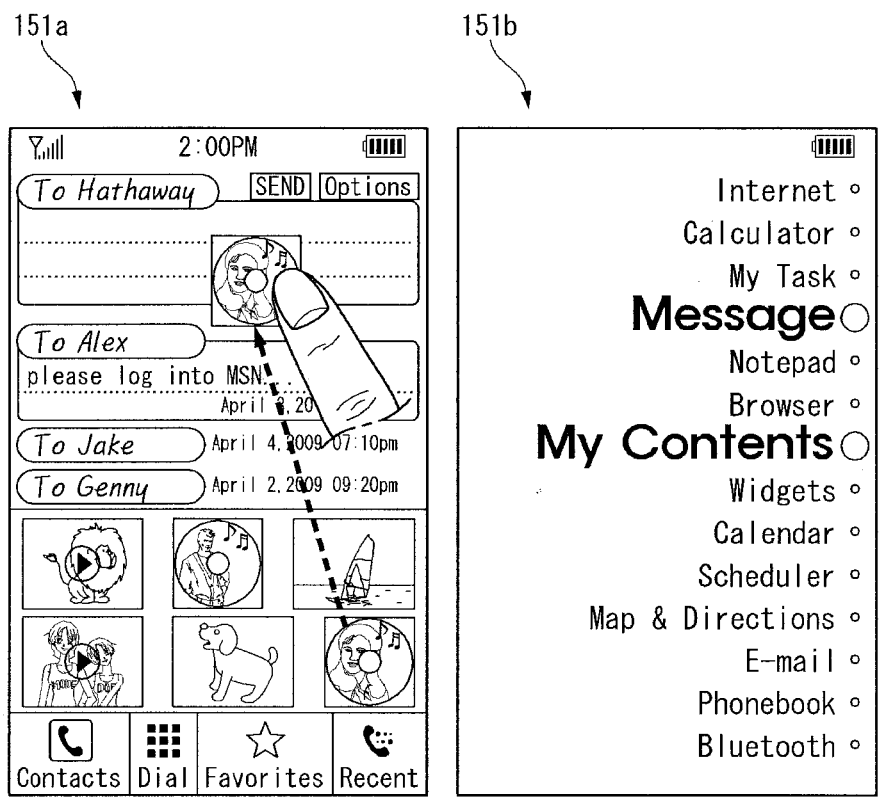
Figure 13C:
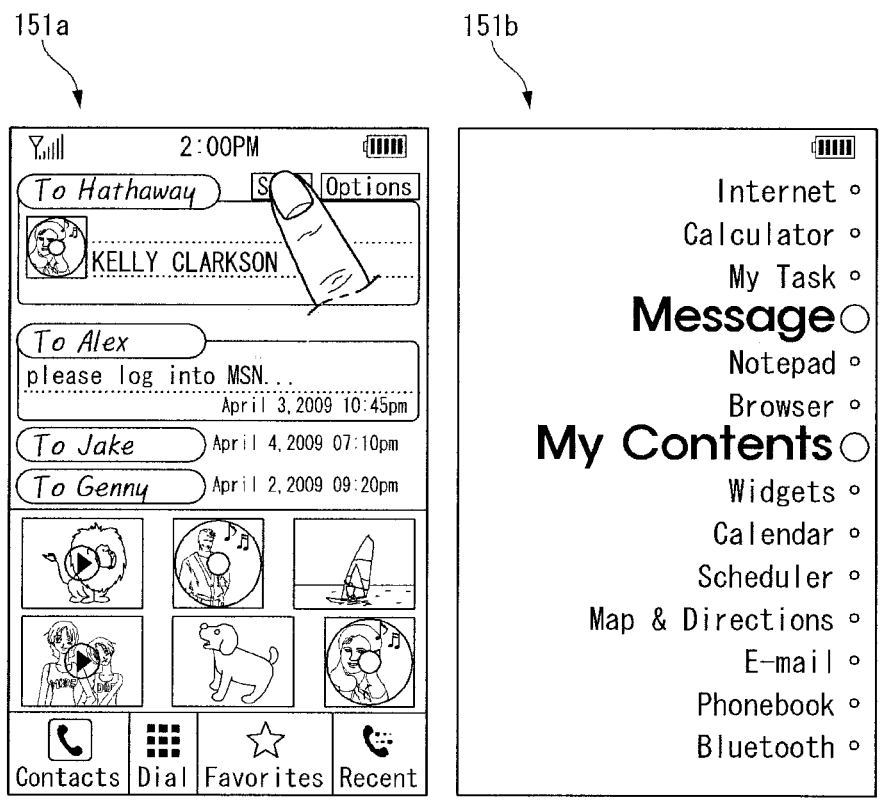

The process of using information after multi-selecting is performed may now be described with reference to FIGS. 13A to 13C. FIGS. 13A to 13C illustrate using information after information items are multi-selected.

FIG. 13A illustrates a display screen in which a message writing window 54 is activated when the recipient (i.e., 'Hathaway') displayed on the first touch screen 151a is selected after the 'Message' item and 'My Contents' item are multi-selected as the first information item and the second information item, respectively.

As shown in FIGS. 13A to 13C, the user may touch-select particular information (i.e., multimedia contents) included as the second information displayed on the first touch screen 151a and drag the selected information to a region where the first information is selected, to insert the second information into the message writing window 54 at the region where the first information is displayed. While examples may be described with respect to touch and dragging, information may also be moved, copied and/or inserted.

When the multi-selection is performed as shown in FIG. 10D, the first information and the second information may be displayed on a same touchscreen, and thus a user may freely and simply use diverse functions provided by the mobile terminal 100.

FIGS. 13A to 13C illustrate using particular multimedia contents related to the second information when executing the message writing application related to the first information. Other applications may also be used.

For example, as shown in FIG. 12, information items (or information) that may interwork with the message writing application may include various information items such as a scheduler item, a calendar item, a map information item, a phone book item, a calculator item, a clock item, and/or the like, as well as multimedia contents. A general text creation application such as e-mail creation, document creation, memo creation may also be used in a similar manner.

If the user wants to add his schedule to a message to be sent to a recipient while creating the message, the user may use information associated with the scheduler item. When the user wants to provide map information regarding an appointment place to a recipient, the user may add or include information associated with the map information item to the currently created message.

Other information may be used in executing the message writing application, and other examples of using information in the multi-selection state may also be provided.

For example, in order to make a plan for work in the 'My Task' item, the user may use information associated with the scheduler item or the calendar item. In order to keep a housekeeping account book in a Notepad item, the user may use information associated with the calculator item.

Embodiments may be implemented such that when a multi-selection is made, one of the first information or the second information by executing a particular application related to the other one, so user convenience of the terminal can be improved.

Embodiments may provide a mobile terminal capable of increasing user convenience and a method for displaying information in the mobile terminal.

Embodiments may provide a mobile terminal having a graphic user interface (GUI) capable of securing high visual recognition, and a method for displaying information in the mobile terminal.

Embodiments may provide a mobile terminal capable of improving user convenience in input manipulation and in selecting and using functions provided in the mobile terminal, and a method for displaying information in the mobile terminal.

Embodiments may provide a mobile terminal having an improved UI or GUI applicable to a dual-display, and a method for displaying information in the mobile terminal.

A mobile terminal may be provided that includes first and second touch screens, and a controller configured to display both an item list including a plurality of information items and a first information related to a first information item selected from the item list on the first touch screen, to move one of the item list and the first information to display the same on the second touch screen as the second touch screen is activated according to manipulation of the terminal, and to display a second information related to a second information item on the touch screen on which the first information is displayed as the second information item is selected from the item list in a state that the first information item has been selected.

Before the second touch screen is activated, the controller may display the first information in the form of brief information, and once the second touch screen is activated, the controller may change the first information into a form of detailed information and display the same.

Before the second touch screen is activated, the controller may display the first information in a preview state, and once the second touch screen is activated, the controller may change the first information into a state that can be manipulated, and display the same.

One of the first information or the second information may be used in executing a particular application related to the other.

A method may be provided for displaying information that includes: displaying an item list including a plurality of information items on a first touch screen, displaying a first information related to a first information item selected from the item list together with the item list on the first touch screen, and as a second touch screen is activated according to manipulation of the terminal, moving one of the item list and the first information to the second touch screen and displaying the same. Additionally, as a second information item is selected from the item list in a state that the first information item has been selected, the method may also include displaying a second information related to the second information item on the touch screen on which the first information is displayed.

The mobile terminal and method for displaying information in the mobile terminal may have advantages. For example, the mobile terminal may provide improved user convenience. The mobile terminal may provide a GUI with high visual recognition. The mobile terminal may provide user convenience in input manipulation and in selecting and using functions provided in the mobile terminal. The mobile terminal may also provide an improved UI or GUI applicable to a dual-display.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
 a first touch screen;
 a second touch screen to display in a preview state or in a manipulation-available state; and
 a controller configured to display, on the first touch screen in a single touch screen state, both an item list including a plurality of information items and a first information associated with a first information item selected from the item list, wherein the first information is displayed in one of the preview state or the manipulation-available state, wherein one of the first information or the item list is moved from the first touch screen to the second touch screen, when the second touch screen is activated, such that the moved one of the first information or the item list is displayed on the second touch screen, and when a second information item is selected from the displayed item list, the controller to display a second information associated with the selected second information item on a same touch screen that displays the first information in the manipulation-available state.

2. The mobile terminal of claim 1, wherein the manipulation-available state allows information to be input.

3. The mobile terminal of claim 1, wherein when an information item selected from the item list changes based on a touch movement on the touch screen displaying the item list, the controller is configured to change a preview image according to information associated with the selected information item based on change of the information item.

4. The mobile terminal of claim 1, wherein the controller is configured to display in a highlighting manner at least one information item that can interwork with the selected first information item.

5. The mobile terminal of claim 1, wherein the first touch screen is provided on a first body of the mobile terminal, and the second touch screen is provided on a second body of the mobile terminal, wherein when the mobile terminal is in a closed configuration, a side facing a surface of the first body where the first touch screen is formed and a side facing a surface of the second body where the second touch screen is formed are brought into a surface-contact, and when the mobile terminal is in an open configuration, the first touch screen and the second touch screen are positioned on a substantially same plane and the second touch screen is activated when the mobile terminal changes from the closed configuration to the open configuration.

6. The mobile terminal of claim 1, wherein one of the first information and the second information is used in executing an application related to the other one of the first information and the second information.

7. The mobile terminal of claim 6, wherein when one of the first information item or the second information item is a message item or an e-mail item, content included in the other one of the first information item and the second information item is used for a message writing application or an e-mail writing application associated with the message item or the e-mail item.

8. The mobile terminal of claim 1, wherein the second information item is selected when a touch operation for selecting the second information item is performed while a touch operation for selecting the first information item is maintained.

9. The mobile terminal of claim 1, wherein when the second information item is selected through a proximity touch at a first proximity distance, the controller displays the second information in the preview state, and when the second information item is selected through a proximity touch at a second proximity distance different from the first proximity distance or with a contact touch, the controller displays the second information in the manipulation-available state.

10. The mobile terminal of claim 1, wherein the controller is configured to:

change at least one of an amount and a manipulation attribute of the first information displayed on the first touch screen in the single touch screen state, and display the changed first information on one of the first touch screen or the second touch screen when both the first touch screen and the second touch screen are activated.

11. The mobile terminal of claim 10, wherein the controller is configured to display the first information in a form of brief information on the first touch screen in the single touch screen state, and when the second touch screen is activated, the controller is configured to change the amount of the first information from the form of brief information into a form of detailed information and display the detailed information on the one of the first touch screen or the second touch screen.

12. The mobile terminal of claim 11, wherein the controller is configured to display the first information in the preview state, and when the second touch screen is activated, the controller is configured to change the manipulation attribute of the first information displayed in the preview state into the manipulation-available state and display the first information in the manipulation-available state on the one of the first touch screen or the second touch screen.

13. A method for displaying information in a mobile terminal, the method comprising:

displaying an item list including a plurality of information items on a first touch screen;

displaying a first information associated with a first information item selected from the displayed item list together with the item list on the first touch screen;

when a second touch screen is activated, moving one of the first information or the item list from the first touch screen to the second touch screen, and displaying the moved one of the first information or the item list on the second touch screen; and when a second information item is selected from the item list in a state that the first information item is selected, displaying a second information associated with the selected second information item on a same touch screen that displays the first information in a manipulation-available state.

14. The method of claim 13, wherein the first information is displayed in a form of brief information, and when the second touch screen is activated, the first information is displayed in a form of detailed information.

15. The method of claim 13, wherein the first information is displayed in a preview state, and when the second touch screen is activated, the first information is displayed in the manipulation-available state.

16. The method of claim 13, wherein when an information item selected from the displayed item list changes based on a touch movement on the touch screen displaying the item list, a preview image is displayed according to information associated with the selected information item based on change of the information item.

17. The method of claim 13, wherein the first touch screen is provided on a first body of the mobile terminal, and the second touch screen is provided on a second body of the mobile terminal, wherein when the mobile terminal is in a closed configuration, a side facing a surface of the first body where the first touch screen is formed and a side facing a surface of the second body where the second touch screen is formed are brought into a surface-contact, and when the mobile terminal is in an open configuration, the first touch screen and the second touch screen are positioned on a substantially same plane and the second touch screen is activated when the mobile terminal changes from the closed configuration to the open configuration.

18. The method of claim 13, further comprising:

changing at least one of an amount and a manipulation attribute of the first information displayed on the first touch screen in the single touch screen state, and displaying the changed first information on one of the first touch screen or the second touch screen when both the first touch screen and the second touch screen are activated.

19. The method of claim 18, wherein the first information is displayed in a form of brief information on the first touch screen in the single touch screen state, and when the second touch screen is activated, the amount of the first information is changed from the form of brief information into a form of detailed information and the detailed information is displayed on the one of the first touch screen or the second touch screen.

20. The method of claim 19, wherein the first information is displayed in the preview state, and when the second touch screen is activated, the manipulation attribute of the first information displayed in the preview state is displayed into the manipulation-available state and the first information in the manipulation-available state is displayed on the one of the first touch screen or the second touch screen.

* * * * *